(12) United States Patent
Chang

(10) Patent No.: US 12,406,437 B2
(45) Date of Patent: Sep. 2, 2025

(54) SKINNING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Tianyuan Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 278 days.

(21) Appl. No.: 18/330,686

(22) Filed: Jun. 7, 2023

(65) Prior Publication Data

US 2023/0351698 A1 Nov. 2, 2023

Related U.S. Application Data

(63) Continuation of application No. PCT/CN2022/125085, filed on Oct. 13, 2022.

(30) Foreign Application Priority Data

Dec. 6, 2021 (CN) .......................... 202111472644.7

(51) Int. Cl.
 *G06T 17/20* (2006.01)
 *G06V 10/80* (2022.01)
(52) U.S. Cl.
 CPC ............ *G06T 17/205* (2013.01); *G06V 10/80* (2022.01)
(58) Field of Classification Search
 CPC ............... G06T 17/205; G06T 2210/16; G06T 2207/30088; G06V 10/80
 See application file for complete search history.

(56) References Cited

U.S. PATENT DOCUMENTS 11,823,345 B2 * 11/2023 Wu .................... G06T 17/205
2012/0019517 A1   1/2012 Corazza et al.
 (Continued)

FOREIGN PATENT DOCUMENTS

CN    112991502 A    6/2021
CN    113240815 A    8/2021
CN    113902876 A    1/2022

OTHER PUBLICATIONS

The World Intellectual Property Organization (WIPO) International Search Report for PCT/CN2022/125085 Dec. 29, 2022 7 Pages (including translation).

(Continued)

*Primary Examiner* — Phuc N Doan
(74) *Attorney, Agent, or Firm* — ANOVA LAW GROUP PLLC

(57) ABSTRACT

A skinning method includes: acquiring a 3D mesh for skinning of a skeletal structure of a 3D object, the 3D mesh including a plurality of vertices and the skeletal structure including a plurality of joints; respectively acquiring global joint weight information corresponding to the plurality of vertices, the global joint weight information of a vertex including associated joints of the vertices predicted based on the 3D mesh, and joint weight values of the associated joints; determining a target vertex to be locally predicted from the vertices of the 3D mesh based on the global joint weight information; performing a local prediction based on a vertex feature of the target vertex to obtain local joint weight information of the target vertex; and optimizing global joint weight information of the target vertex based on the local joint weight information for skinning of the 3D object using the optimized joint weight information.

20 Claims, 10 Drawing Sheets

(56) References Cited

U.S. PATENT DOCUMENTS

| | | | | |
|---|---|---|---|---|
| 2019/0340803 A1* | 11/2019 | Comer | ................... | G06T 17/20 |
| 2020/0005138 A1* | 1/2020 | Wedig | ................... | G06V 40/19 |
| 2020/0035021 A1* | 1/2020 | Horsman | ................. | G06T 7/75 |
| 2020/0410733 A1* | 12/2020 | Liu | ......................... | G06T 15/10 |
| 2021/0049811 A1* | 2/2021 | Fedyukov | ................ | G06T 7/60 |
| 2022/0237879 A1* | 7/2022 | Wu | ........................ | G06T 15/04 |
| 2022/0406016 A1* | 12/2022 | Gibbs | ................... | G06T 19/20 |
| 2023/0351698 A1 | 11/2023 | Chang | | |

OTHER PUBLICATIONS

Yu-Jie Yuan, Yu-Kun Lai, Tong Wu, etc. Data-driven weight optimization for real-time mesh deformation Graphical Models, Jun. 22, 2019 (Jun. 22, 2019) vol. 104.

* cited by examiner (a) (b)

SKINNING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/125085, filed on Oct. 13, 2022, which claims priority to Chinese Patent Application No. 202111472644.7, entitled "SKELETAL SKINNING METHOD AND APPARATUS, COMPUTER DEVICE, AND STORAGE MEDIUM", filed on Dec. 6, 2021 with China National Intellectual Property Administration, the entire contents of both of which are incorporated herein by reference.

FIELD OF THE TECHNOLOGY

The present disclosure relates to the technical field of computers, and in particular to, a skinning method and apparatus, a computer device, and a storage medium.

BACKGROUND

With the development of computer technology, skinning technology has emerged. Skinning is to bind vertices in a three-dimensional (3D) mesh to joints to generate skinned mesh. Each vertex may be controlled by a plurality of different joints, and the joint weights determine how much the vertex is affected by the different joints.

In skinning methods in related art, when binding vertices to joints, the vertices are typically manually bound to the joints, for example, an artist manually binds the vertices to the joints.

However, due to a large error of the way of manual binding, there is a large error in the binding relationship between the vertices and the joints, resulting in a low accuracy of the skinning.

SUMMARY

A skinning method and apparatus, a computer device, a storage medium, and a computer program product are provided in accordance with various embodiments provided in the present disclosure.

A skinning method, executed by a computer device, including: acquiring a three-dimensional (3D) mesh for skinning of a skeletal structure of a 3D object, the 3D mesh including a plurality of vertices and the skeletal structure including a plurality of joints; respectively acquiring global joint weight information corresponding to the plurality of vertices, the global joint weight information corresponding to a vertex including associated joints of the vertices predicted based on the whole 3D mesh, and joint weight values of the associated joints; determining a target vertex to be locally predicted from the vertices of the 3D mesh based on the global joint weight information; performing a local prediction based on a vertex feature of the target vertex to obtain local joint weight information of the target vertex, the local joint weight information including a local associated joint of the target vertex and a local joint weight corresponding to the local associated joint; the local joint weight indicating a degree of association between the local associated joint and the target vertex, and the local associated joint of the target vertex being an associated joint of the target vertex predicted based on a local mesh region in the 3D mesh; and optimizing global joint weight information of the target vertex based on the local joint weight information to obtain optimized joint weight information, and generating skinned mesh of the 3D object using the optimized joint weight information.

A skinning apparatus includes: a mesh acquisition module, configured to acquire a 3D mesh for skinning of a skeletal structure of a 3D object, the 3D mesh including a plurality of vertices and the skeletal structure including a plurality of joints; an information acquisition module, configured to respectively acquire global joint weight information corresponding to the plurality of vertices, the global joint weight information corresponding to a vertex including associated joints of the vertex predicted based on the whole 3D mesh and joint weight values of the associated joints; a vertex determination module, configured to determine a target vertex to be locally predicted from the vertices of the 3D mesh based on the global joint weight information; a local prediction module, configured to perform a local prediction based on a vertex feature of the target vertex to obtain local joint weight information of the target vertex, the local joint weight information including a local associated joint of the target vertex and a local joint weight value corresponding to the local associated joint; the local joint weight value indicating a degree of association between the local associated joint and the target vertex, and the local associated joint of the target vertex being an associated joint of the target vertex predicted based on a local mesh region in the 3D mesh; and an information optimization module, configured to optimize global joint weight information of the target vertex based on the local joint weight information for skinning of the 3D object using the optimized joint weight information.

A computer device includes one or more processors and a memory storing computer-readable instructions, the computer-readable instructions, when executed by the one or more processors, causing the one or more processors to implement the steps in the above skinning method.

One or more non-transitory readable storage media store computer-readable instructions, the computer-readable instructions, when executed by one or more processors, causing the one or more processors to implement the steps in the above skinning method.

Details of one or more embodiments of the present disclosure are set forth in the drawings and description below. Other features, objects, and advantages of the present disclosure will be apparent from the specification, drawings, and claims.

BRIEF DESCRIPTION OF THE DRAWINGS

In order to explain the technical solutions of the embodiments of the present disclosure more clearly, the following description is given with reference to the drawings, which are required to be used in the description of the embodiments. It is obvious that the drawings in the following description are only some embodiments of the present disclosure. The ordinarily skilled in the art would have been able to acquire other drawings according to these drawings without involving any inventive effort.

DESCRIPTION OF EMBODIMENTS

To make the objectives, technical solutions, and advantages of the present disclosure clearer, the following further describes the present disclosure in detail with reference to the drawings and the embodiments. It is to be understood that the specific embodiments described herein are intended only to interpret the present disclosure and are not intended to limit it.

Figure 1:
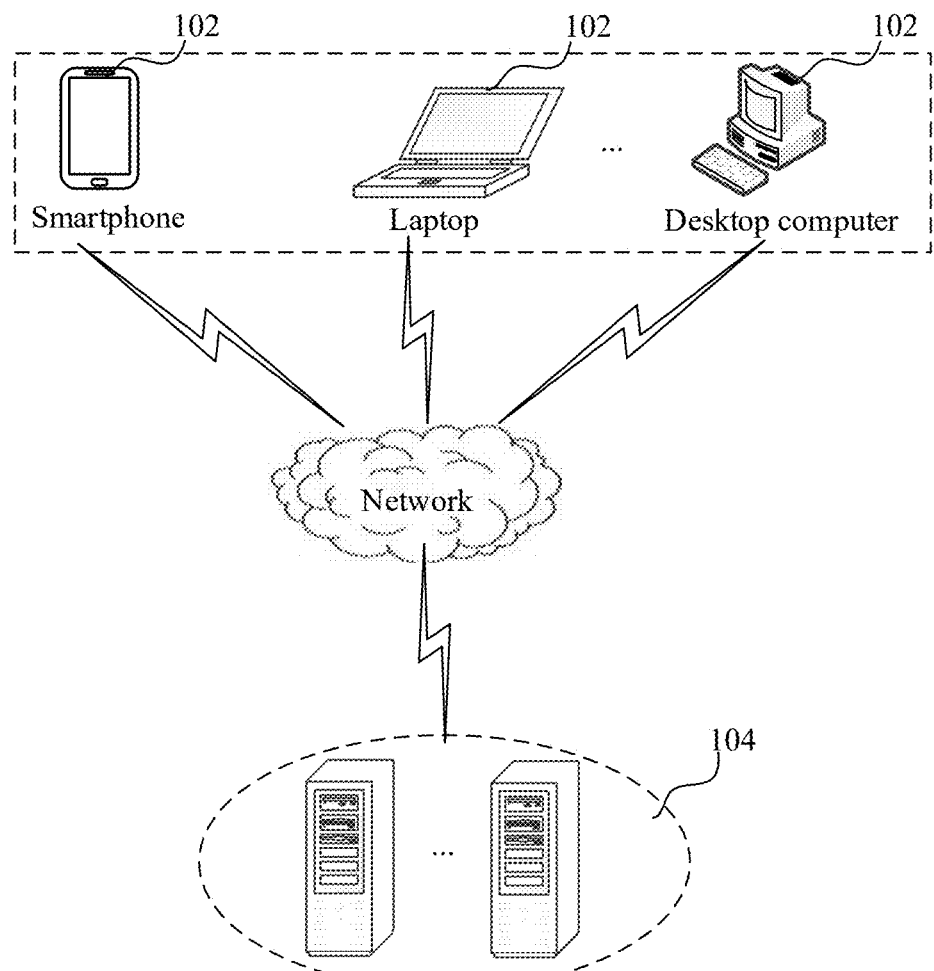
FIG. 1 is an application environment diagram of a skinning method in some embodiments.

The skinning method provided by the present disclosure is applicable in an application environment as shown in FIG. 1. The present disclosure environment includes a terminal 102 and a server. The terminal 102 may include at least one of a smartphone, a laptop, or a desktop computer. The terminal 102 communicates with the server 104 via a network.

The terminal 102 performs the following steps: acquiring a 3D mesh for skinning of a skeletal structure of a 3D object, the 3D mesh including a plurality of vertices and the skeletal structure including a plurality of joints; acquiring global joint weight information corresponding to each of the plurality of vertices, the global joint weight information being obtained by performing global prediction on a degree of association between the vertices and the joints based on the 3D mesh; determining a target vertex to be locally predicted from the vertices of the 3D mesh based on the global joint weight information; performing a local prediction based on a vertex feature of the target vertex to obtain local joint weight information of the target vertex, the local joint weight information including a local associated joint of the target vertex and a local joint weight corresponding to the local associated joint, and the local joint weight indicating a degree of association between the local associated joint and the target vertex; and optimizing global joint weight information of the target vertex based on the local joint weight information for skinning of the 3D object using the optimized joint weight information. The terminal 102 may upload the skeletal skinned 3D object to the server 104. The server 104 may store the skeletal skinned 3D object, and may also forward the skeletal skinned 3D object to other terminal devices.

The terminal 102 may be, but is not limited to, a variety of personal computers, laptops, smartphones, tablets, and portable wearable devices. The server 104 may be implemented with a standalone server or a server cluster composed of a plurality of servers.

The skinning method provided by the present disclosure is applicable in the field of animation and games, and for example, may be used to perform skinning for a virtual character in an animation or game, for example, to provide costumes for the virtual character.

It should be noted that the user information (including but not limited to user equipment information, user personal information, and the like) and data (including but not limited to data used for analysis, stored data, displayed data, and the like) involved in the present disclosure are information and data authorized by the user or fully authorized by all parties. The collection, use, and processing of relevant data shall comply with relevant laws and regulations and standards of relevant countries and regions. For example, the 3D object, skeletal structure, and 3D mesh involved in the present disclosure are acquired with full authorization.

The skinning method provided by the present disclosure may be based on artificial intelligence, for example, in the present disclosure, joint weight information of vertices may be determined using a joint weight prediction model, which is an artificial intelligence-based model, such as a trained neural network model, for predicting associated joints associated with the vertices and weights of the associated joints.

Figure 2:
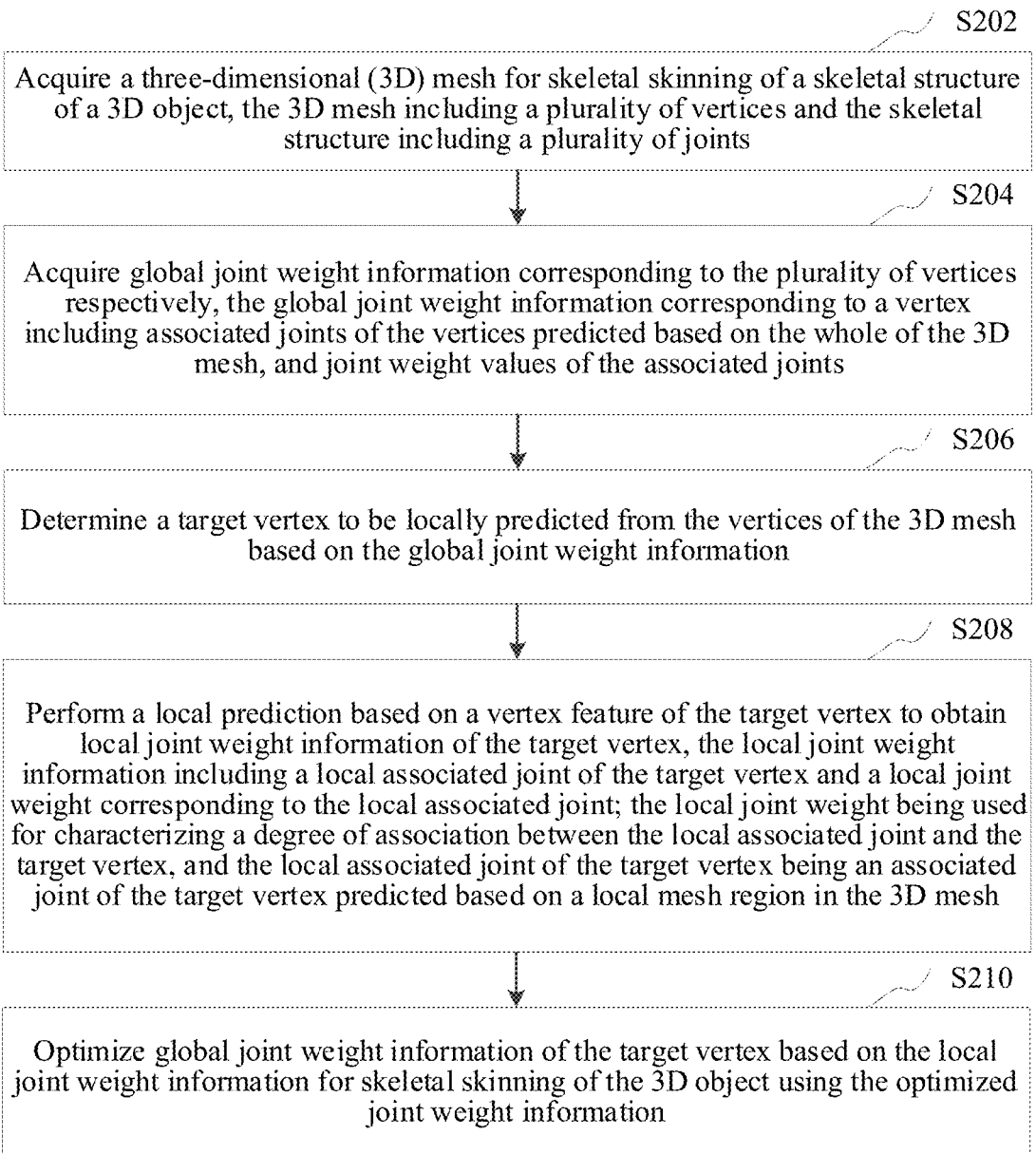
FIG. 2 is a flow diagram of a skinning method in some embodiments.

In some embodiments, as shown in FIG. 2, a skinning method is provided. The method may be executed by a terminal, by a server, and may also be executed by both the terminal and the server. In particular, the method is illustrated as applied to the terminal 102 in FIG. 1, including the following steps:

Step S202: Acquire a 3D mesh for skinning of a skeletal structure of a 3D object. The 3D mesh includes a plurality of vertices. The skeletal structure includes a plurality of joints.

The object is a virtual object, including but not limited to a virtual human or animal. A 3D object is an object in a 3D form, which may be, for example, a character in an animation or game.

The 3D object may be generated from the skeletal structure and the 3D mesh, the skeletal structure being used for generating bones of the 3D object, which may also be referred to as a bone structure. The 3D mesh is used for generating costumes of the 3D object. The 3D mesh of the 3D object is a graph topology structure of the costumes of the 3D object. The skeletal structure of the 3D object includes a plurality of joints. The type and number of the joints may be preset or set as needed. The 3D mesh includes a vertex and an edge, the edge referring to a connecting line between two vertices. A graph topology structure may be used to represent the 3D mesh. The graph topology structure $G_m$ of the 3D mesh may be represented as $G_m=(V_m,E_m,A_m)$, $V_m$ representing the vertex in the 3D mesh, representing the edge in the 3D mesh, and $A_m$ representing a vertex adjacency matrix corresponding to the 3D mesh. The size of $A_m$ is a V by V matrix, and the value of each element in $A_m$ is 0 or 1. $A_m$ represents connectivity between vertices in the 3D mesh. Assuming that $a_m(i,j)$ is an element of row i and column j in $A_m$, $a_m(i,j)=1$ indicates that there is a connecting edge between vertex i and vertex j, that is, vertex i is connected to vertex j; and $a_m(i,j)=0$ indicates that there is no connecting edge between vertex i and vertex j, that is, vertex i is not connected to vertex j. Two vertices that are connected may be referred to as neighbor vertices of each other. For example, vertex i is connected to vertex j, then vertex i is a neighbor vertex of vertex j, and vertex j is also a neighbor vertex of vertex i.

Figure 3:
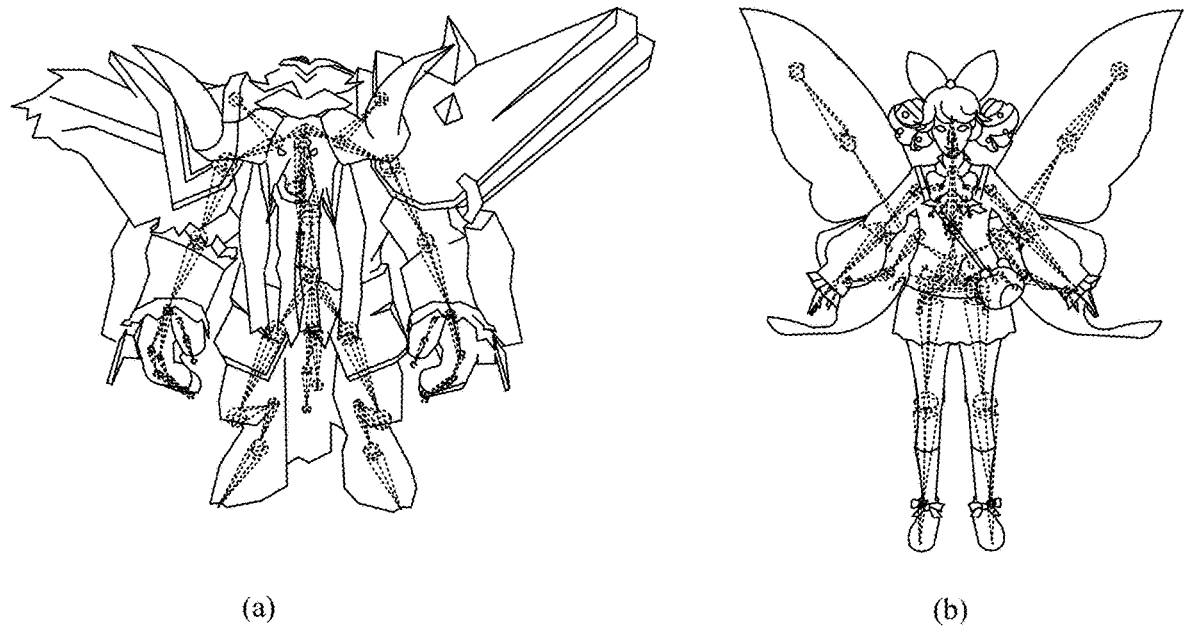
FIG. 3 is a diagram of a skeletal structure and a costume of a 3D object in some embodiments.

Skinning is to bind the vertices in 3D mesh of costumes to the joints of the skeletal structure. Each vertex may be controlled by a plurality of different joints, and the joint weights determine how much the vertex is affected by the different joints. There is a strong correlation between the skeletal structure and the design of costumes. Depending on costumes, the corresponding skeletal structures may also be different. As shown in FIG. 3, different bone structures and 3D mesh diagrams of costumes are shown. Dotted lines constitute the skeletal structure, and solid lines constitute a 3D mesh of costumes. It can be seen from the drawings that the costume in (a) is different from the costume in (b), and the skeletal structure in (a) is also different from the skeletal structure in (b).

Specifically, the terminal may determine joints associated with each vertex in the 3D mesh from the skeletal structure, determine the joint associated with the vertex as an associated joint of the vertex, determine a joint weight value corresponding to each associated joint of the vertex, and establish an association relationship between the vertex and the joint using the joint weight value corresponding to the associated joint. For each vertex, the association relationship corresponding to the vertex includes the associated joint of the vertex and the joint weight value of the associated joint. The movement of the associated joint may affect the movement of the vertex associated therewith, and the vertex may move with the movement of the associated joint. The degree of influence of the associated joint on the vertex associated therewith is positively correlated with the joint weight value of the associated joint. The greater the joint weight value, the greater the degree of influence of the associated joint on the vertex associated therewith. Thus, based on the established association relationship, when controlling the movement of the 3D object, the movement of the 3D mesh may be driven by controlling the movement of the joint; and when the 3D mesh is a mesh corresponding to costumes, the movement of the joint can be controlled to drive the movement of the costumes, thus improving the control efficiency of the 3D object. Weight values may also be referred to as weights.

A positive correlation refers to that all else being equal, two variables change in the same direction, and when one variable changes from large to small, the other variable also changes from large to small. It will be appreciated that a positive correlation herein means that the change direction is the same, but it does not require that the other changes as one variable changing a little. For example, it can be set that when variable a is 10 to 20, the variable b is 100; and when variable a is 20 to 30, the variable b is 120. In this way, the change direction of a and b is that when a becomes larger, b also becomes larger. However, when a is in the range of 10 to 20, b may be unchanged.

Step S204: Acquire global joint weight information corresponding to the plurality of vertices respectively, the global joint weight information corresponding to a vertex including associated joints of the vertex predicted based on the whole 3D mesh and joint weight values of the associated joints.

Each vertex corresponds to respective joint weight information. For each vertex, the joint weight information of the vertex includes an associated joint of the vertex and a joint weight value corresponding to the associated joint. The joint weight information is global joint weight information when the joint weight information is predicted from the 3D mesh in whole, namely, from the global prediction. The joint weight information is local joint weight information when the joint weight information is predicted from a local mesh region in the 3D mesh, namely, from the local prediction. The global joint weight information is obtained by performing global prediction on a degree of association between the vertex and the joint based on the 3D mesh. The global joint weight information includes an associated joint of a vertex obtained by performing global prediction on the degree of association between the vertex and the joint based on the 3D mesh, and a joint weight value of the associated joint.

The degree of association between the vertex and the joint refers to the degree of influence of the joint on the vertex. The degree of association has a positive correlation with the degree of influence, and the degree of association has a positive correlation with the joint weight value.

Specifically, the terminal may take the 3D mesh in whole to predict an associated joint corresponding to each vertex in the 3D mesh and a joint weight value corresponding to the associated joint. For each vertex, the associated joint and the joint weight value of the vertex constitute the global joint weight information of the vertex.

In some embodiments, the terminal can acquire a global joint weight prediction model, and predict global joint weight information corresponding to each vertex in the 3D mesh using the global joint weight prediction model. The global joint weight prediction model is a trained neural network model, for example, may be a global model trained using 3D mesh data of a complex costume, for predicting joint weight information of vertices using the 3D mesh in whole. The input of the global joint weight prediction model includes a 3D mesh and a skeletal structure, and the output includes joint weight information corresponding to each vertex. Since the global joint weight prediction model predicts the joint weight information of the vertices by taking the 3D mesh in whole, namely, from the global prediction, the joint weight information corresponding to the vertices output by the global joint weight prediction model is determined as the global joint weight information corresponding to the vertices. The global joint weight prediction model may be referred to as a global model. The global model may be a custom neural network model.

Step S206: Determine a target vertex to be locally predicted from the vertices of the 3D mesh based on the global joint weight information.

The target vertex refers to a vertex in each vertex of the 3D mesh which needs further prediction of joint weight information. In further predicting the joint weight information of the target vertex, the prediction is performed based on the target vertex rather than the whole 3D mesh, and thus is referred to as a target vertex to be locally predicted.

Specifically, the terminal may determine the accuracy of the predicted global joint weight information. When it is determined that the accuracy of the global joint weight information is less than an accuracy threshold, the global joint weight information is determined to be abnormal joint weight information, and a vertex corresponding to the abnormal joint weight information is determined to be an abnormal vertex. There may be one or a plurality of abnormal vertices, the plurality referring to at least two. The terminal may determine the target vertex to be locally predicted based on the abnormal vertex, the target vertex including the abnormal vertex, for example, using the abnormal vertex as a target vertex, or determining a target vertex to be locally predicted based on the position of the abnormal vertex in the 3D mesh. The accuracy threshold may be preset or set as desired.

In some embodiments, the abnormal vertices may be selected from the 3D mesh by a selection operation. For example, the terminal may perform skeleton skinning on a 3D object based on global joint weight information corresponding to each vertex in the 3D mesh, and display the skeleton-skinned 3D object. A user may perform a selection operation on one or more vertices of the skeleton-skinned 3D object being displayed, for example, selecting the vertex by clicking the vertex with a mouse; the user may also achieve the effect of selecting the vertex by selecting a region. For example, the user may also perform a selection operation on some regions or all regions of the displayed 3D object, for example, the vertices in a region are selected by selecting the region with a mouse. When the terminal detects a selection operation for a vertex or region in the 3D object of the skeleton-skinned 3D object being displayed and receives a local detection triggering operation, the selected vertex is determined to be an abnormal vertex. The abnormal vertex may be a vertex with a joint mis-binding or a mesh insertion problem.

Step S208: Perform a local prediction based on a vertex feature of the target vertex to obtain local joint weight information of the target vertex, the local joint weight information including a local associated joint of the target vertex and a local joint weight corresponding to the local associated joint; the local joint weight indicating a degree of association between the local associated joint and the target vertex, and the local associated joint of the target vertex being an associated joint of the target vertex predicted based on a local mesh region in the 3D mesh.

The vertex feature may include the position of the vertex, such as the coordinates of the vertex in a 3D coordinate system. Joint features may include the position of the joint, such as the coordinates of the joint in the 3D coordinate system. Each target vertex has respective local joint weight information.

Specifically, the terminal may predict a joint weight value of each joint of the skeletal structure for each target vertex based on the vertex feature of each target vertex, and determine the local associated joint of the target vertex based on the joint weight value. For example, for each target vertex, the terminal may take a joint with a joint weight value greater than a weight threshold as a local associated joint of the target vertex, the joint weight value of the local associated joint being a local joint weight. Local joint weight information of the target vertex is obtained based on each local associated joint of the target vertex and the local joint weight of the local associated joint. The weight threshold may be preset or set as desired. Of course, the terminal may also arrange various joints according to the order of joint weight values from large to small to obtain a joint sequence, and acquire, from the joint sequence, a joint with a joint ranking before a ranking threshold as a local associated joint of the target vertex. Joint ranking refers to the ranking of joints in the joint sequence. The ranking threshold may be preset or set as desired.

In some embodiments, the terminal may select one or more candidate joints from the joints of the skeletal structure. The candidate joints may be preset, determined based on user operations, or determined based on the position of the target vertex. For example, the terminal may determine a region occupied by the target vertex in the 3D mesh, and take a joint in the skeletal structure that is in the region as a candidate joint. The terminal may predict a joint weight value of each candidate joint for each target vertex based on the vertex feature of each target vertex and the joint feature of each candidate joint. For example, there are fifty target vertices and five candidate joints, then joint weight values corresponding to the five candidate joints are predicted when the vertex is an $ii^{th}$ target vertex of the fifty target vertices. The value range of ii is each positive number from 1 to 50, for example, when ii is 1, joint weight values corresponding to the five candidate joints are predicted when the vertex is the first target vertex. After predicting a joint weight value of each candidate joint for each target vertex, the terminal can take, for each target vertex, a candidate joint with a joint weight value greater than a weight threshold as a local associated joint of the target vertex, or arrange each candidate joint according to the order of the joint weight values from large to small to obtain a candidate joint sequence, and acquire, from the candidate joint sequence, a candidate joint with a joint ranking before the ranking threshold as the local associated joint of the target vertex. The joint ranking in the embodiment refers to the ranking of candidate joints in the candidate joint sequence.

In some embodiments, the terminal may acquire a local joint weight prediction model, the local joint weight prediction model being used for predicting joint weight information corresponding to the vertex. The terminal may take a vertex feature of each target vertex as an input of the local joint weight prediction model, and use the local joint weight prediction model to predict and obtain local joint weight information corresponding to each target vertex. The local joint weight prediction model may be referred to as a local model.

In some embodiments, the input of the local joint weight prediction model may also include joint features of the candidate joint. The terminal may take the vertex feature of each target vertex and the joint feature of each candidate joint as inputs of the local joint weight prediction model, and for each target vertex, predict a joint weight value corresponding to each candidate joint using the local joint weight prediction model.

In some embodiments, the local joint weight prediction model may be a trained neural network model. For example, 3D mesh data of a complex costume may be divided into a plurality of unconnected subgraphs based on graph connectivity to construct local data, and the local data is used to train the local joint weight prediction model. The neural network model corresponding to the local joint weight prediction model may be a model constructed by the inventor of the present disclosure through inventive efforts.

Step S210: Optimize global joint weight information of the target vertex based on the local joint weight information to obtain optimized joint weight information, and generate skinned mesh of the 3D object using the optimized joint weight information.

Specifically, for each target vertex, the terminal may determine the optimized joint weight information corresponding to the target vertex based on the local joint weight information and the global joint weight information of the target vertex. For example, the terminal may select one joint weight information with higher accuracy from the local joint weight information and the global joint weight information of the target vertex as the joint weight information and as the optimized joint weight information corresponding to the target vertex.

In some embodiments, for each vertex in the 3D mesh, when the vertex is a target vertex, the optimized joint weight information corresponding to the vertex is taken as final joint weight information; when the vertex is not a target vertex, the global joint weight information corresponding to the vertex is taken as final joint weight information; and skinning is performed on the 3D object using the final joint weight information corresponding to each vertex in the 3D mesh. The terminal may perform multiple optimizations on the joint weight information. For example, after the optimization of the joint weight information using steps S202 to S210, the optimized joint weight information may be used to perform skinning on the 3D object and display the skinning effect of the 3D object. When the local detection triggering operation on the displayed 3D object is acquired, the target vertex is re-determined and the local joint weight information of the target vertex is predicted to further optimize the joint weight information, and the optimization can be stopped until the overall skinning performance is normal. The optimization can be stopped, for example, until the 3D mesh overall skinning performance of a complex costume is normal.

Figure 4:
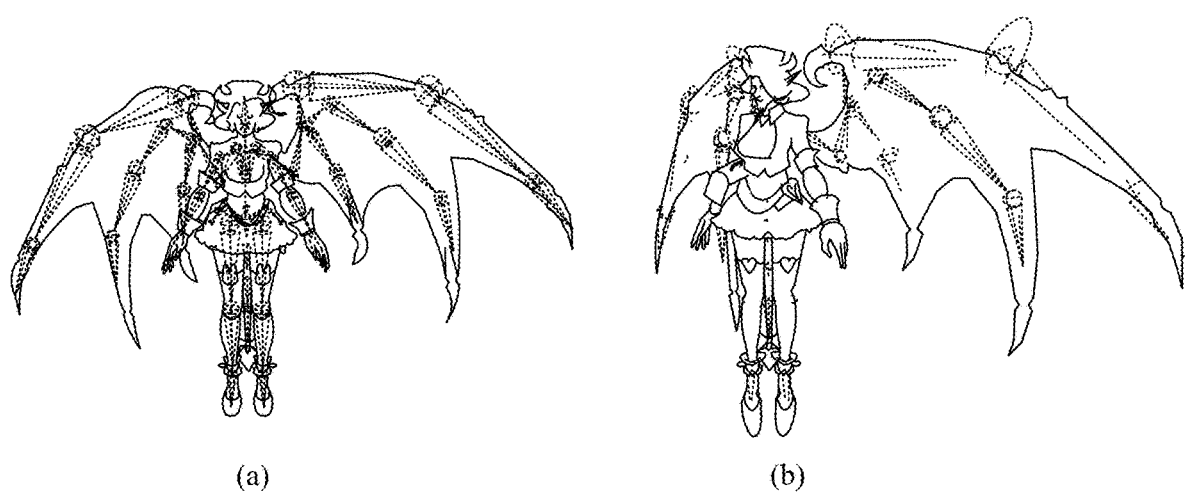
FIG. 4 is a comparison diagram of a 3D object before and after moving in some embodiments.

In some embodiments, the pose of the 3D object may be preset when performing skinning, for example, the pose may be an a-pose (standing pose). For example, the skin with the same mesh precision of different characters in a game is mostly bound based on a set of standard skeletal structures; the size and height of standard bones substantially determine the position and coordinates of various body regions of 3D mesh. Therefore, the bones are fixed in an a-pose (standing pose) during the skinning process, which helps the feature distribution of the model learning data. After skinning, the 3D mesh can be controlled in tension and deformation by controlling the motion of the joint. As shown in FIG. 4, (a) is a 3D mesh costume in an a-pose (standing pose), the dotted lines being the skeletal structure corresponding to a costume 3D mesh. 3D mesh binds a mesh to the human joint via the joint weight value of the vertex, and in this way, it is determined that each body region of 3D mesh is deformed and stretched by different joint weights during the movement. (b) is the overall skinning performance effect of 3D mesh with vertex joint weights after rotating the spine joints of the torso by a certain angle. The region around the spine joints of the torso has obvious tension and deformation.

The above skinning method includes the following steps: determining a target vertex to be locally predicted from the vertices of the 3D mesh based on the global joint weight information; performing a local prediction based on a vertex feature of the target vertex to obtain local joint weight information of the target vertex, the local joint weight information including a local associated joint of the target vertex and a local joint weight corresponding to the local associated joint, and the local joint weight indicating a degree of association between the local associated joint and the target vertex; and optimizing global joint weight information of the target vertex based on the local joint weight information for skinning of the 3D object using the optimized joint weight information. The global joint weight information is predicted based on the whole of the 3D mesh, namely, is predicted based on the global feature; and the local associated joint of the target vertex is an associated joint of a target vertex predicted based on the local mesh region in the 3D mesh; then the global joint weight information of the target vertex is optimized based on the local joint weight information, and the global prediction result is optimized based on the local feature. Therefore, the accuracy of the prediction is improved by combining the local prediction based on the global prediction, thereby improving the accuracy of the skinning.

Figure 5:
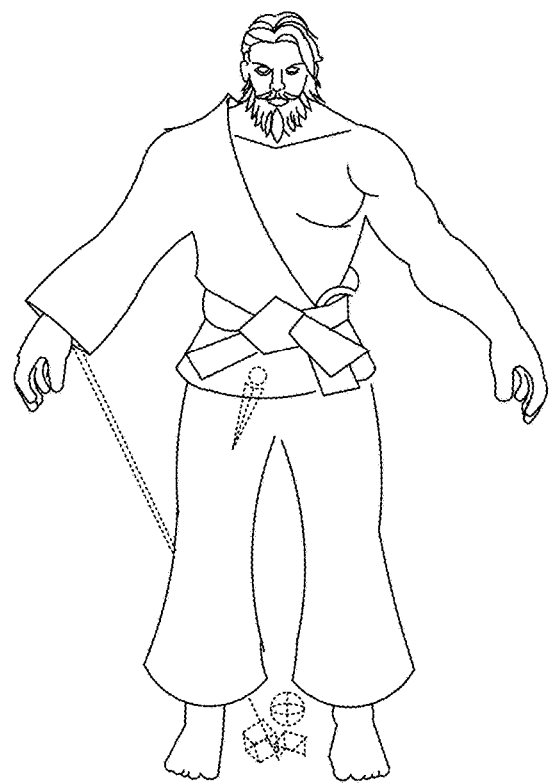
FIG. 5 is a diagram showing a skinning effect of different costumes in some embodiments.
Figure 5:
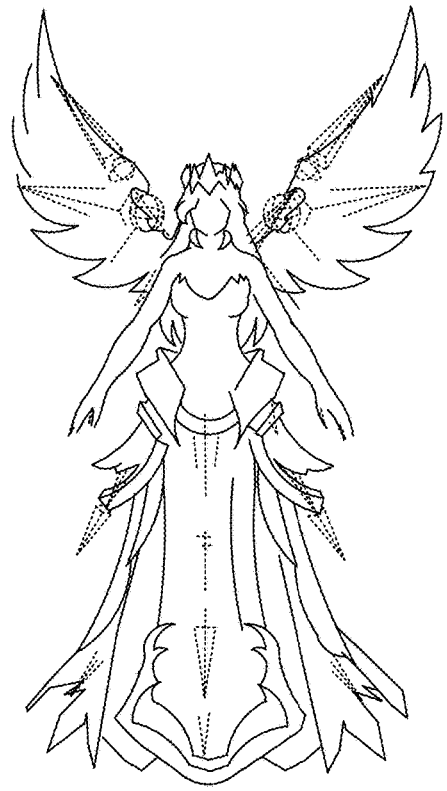

The design of the complex non-close-fitting costume is more diverse and richer than that of the simple close-fitting costume, and it is more difficult for the distribution of the vertex joint weights of the model prediction. As shown in FIG. 5, the skinning effects of the simple close-fitting costume and the complex non-close-fitting costume are shown, with dotted lines constituting the skeletal structure and solid lines constituting a 3D mesh of costumes. It can be seen from the drawings that the design of the complex non-close-fitting costume in (b) is more diverse and richer than that of the simple close-fitting costume in (a); and there are more parts of the skeletal structure in (b) exposed outside the costume. The complex non-close-fitting costume is more difficult for the distribution of the vertex joint weights of the model prediction, and the skinning effect of the complex non-close-fitting costume is worse. The skinning method provided by the present disclosure is mainly composed of two stages: in the first stage, an end-to-end global model is used to perform joint weight prediction on all the vertices of the overall region of the complex costume; in the second stage, the vertices of the region of the partial costume with poor skinning performance of the complex costume and the joints needing to be bound with joint weights are given to a local model to re-predict the joint weights of the vertices. The global model is mainly responsible for predicting the joint weights of the vertices of the close-fitting torso region of the complex costume; and the local model is mainly responsible for the region of the complex costume with poor skinning performance in the global model (such as skirts, belts, ribbons, and other regional vertices). The local model is used to optimize the skinning effect by secondary prediction of the joint weights of these regional vertices. Thus, by an interactive vertex joint weight prediction method combining the global model with the local model (that is, local interaction method is used to predict the skinning of the complex costume), the problems of joint mis-binding and mesh insertion of the end-to-end model in the local region of the complex costume are effectively alleviated, and the skinning effect of the complex costume is improved. At the same time, the local interaction method provides artists with a function to adjust the distribution of vertex joint weights flexibly and freely, making the skinning prediction of the 3D mesh of the complex costume more controllable.

The skinning method provided in the present disclosure is applicable to scenes of different bone structures, different mesh accuracies, and automatic prediction of vertex joint weights of close-fitting and non-close-fitting 3D meshes of the complex costume, with a wide scope of application. For example, it is applicable in the task of automatic prediction of the vertex joint weights of a 3D mesh of a costume in a game, which effectively solves the problems of partial vertex joint weights mis-binding and the insertion of inner and outer layers of the mesh in complex costumes in games, and further improves the prediction accuracy of vertex joint weights.

In some embodiments, the determining a target vertex to be locally predicted from the vertices of the 3D mesh based on the global joint weight information includes: determining a vertex corresponding to abnormal global joint weight information to obtain an abnormal vertex; and determining a target vertex to be locally predicted from the vertices of the 3D mesh based on the abnormal vertex, the target vertex including the abnormal vertex.

Specifically, the terminal may take the abnormal vertex as the target vertex or determine the target vertex based on the position of the abnormal vertex in the 3D mesh. For example, the terminal may determine a mesh region in which an abnormal vertex is located from the 3D mesh, and determine a target vertex based on each vertex in the mesh region. For example, at least one vertex in the mesh region may be taken as the target vertex, or all vertices in the mesh region may be taken as the target vertices, or the target vertex may be filtered from each vertex in the mesh region. For example, for each vertex in the mesh region, the terminal may calculate a distance between each vertex in the mesh region and an abnormal vertex to obtain a vertex distance corresponding to the vertex, and take the vertex as a target vertex when the vertex distance corresponding to the vertex is less than a vertex distance threshold. The vertex distance threshold may be preset or set as desired.

In the embodiment, since the global joint weight information of the abnormal vertex is abnormal, namely, the joint weight information of the global prediction is inaccurate, based on the abnormal vertex, the target vertex to be locally predicted is determined from the vertices of the 3D mesh; and the vertex with inaccurate joint weight information obtained in the global prediction stage can be further predicted, thereby improving the accuracy of prediction.

In some embodiments, the 3D mesh includes a plurality of mesh regions, and the determining a target vertex to be locally predicted from the vertices of the 3D mesh based on the abnormal vertices includes: determining a mesh region to which the abnormal vertex belongs from the plurality of mesh regions of the 3D mesh to obtain an abnormal mesh region; and determining the target vertex to be locally predicted based on each vertex in the abnormal mesh region.

The 3D mesh includes a plurality of mesh regions; the 3D mesh may be referred to as a mesh graph; and the mesh regions may be referred to as subgraphs in the mesh graph. The mesh regions may be pre-divided or may be divided as desired. Different mesh regions may have a connection relationship, that is, the mesh regions may be connected. There may also be no connection relationship between different mesh regions, that is, the mesh regions are unconnected. When the mesh regions are unconnected, the mesh regions may also be referred to as unconnected subgraphs. A vertex in one unconnected subgraph has no path reachable with a vertex in other unconnected subgraphs. For example, a graph topology structure $G_m$ of a mesh costume may be divided into a plurality of unconnected subgraphs $\{G_{11}, G_{12}, \ldots, G_{1n}\}$ based on graph connectivity, $G_{11}$ to $G_{1n}$ being the graph topology structure of n unconnected subgraphs. If a path exists from a vertex $v_i$ to a vertex $v_j$, the vertex $v_i$ and the vertex $v_j$ are considered connected; and if there is no path reachable from the vertex $v_i$ to the vertex $v_j$, the subgraph where the vertex $v_i$ is located and the subgraph where the vertex $v_j$ is located are two unconnected subgraphs.

Figure 6:
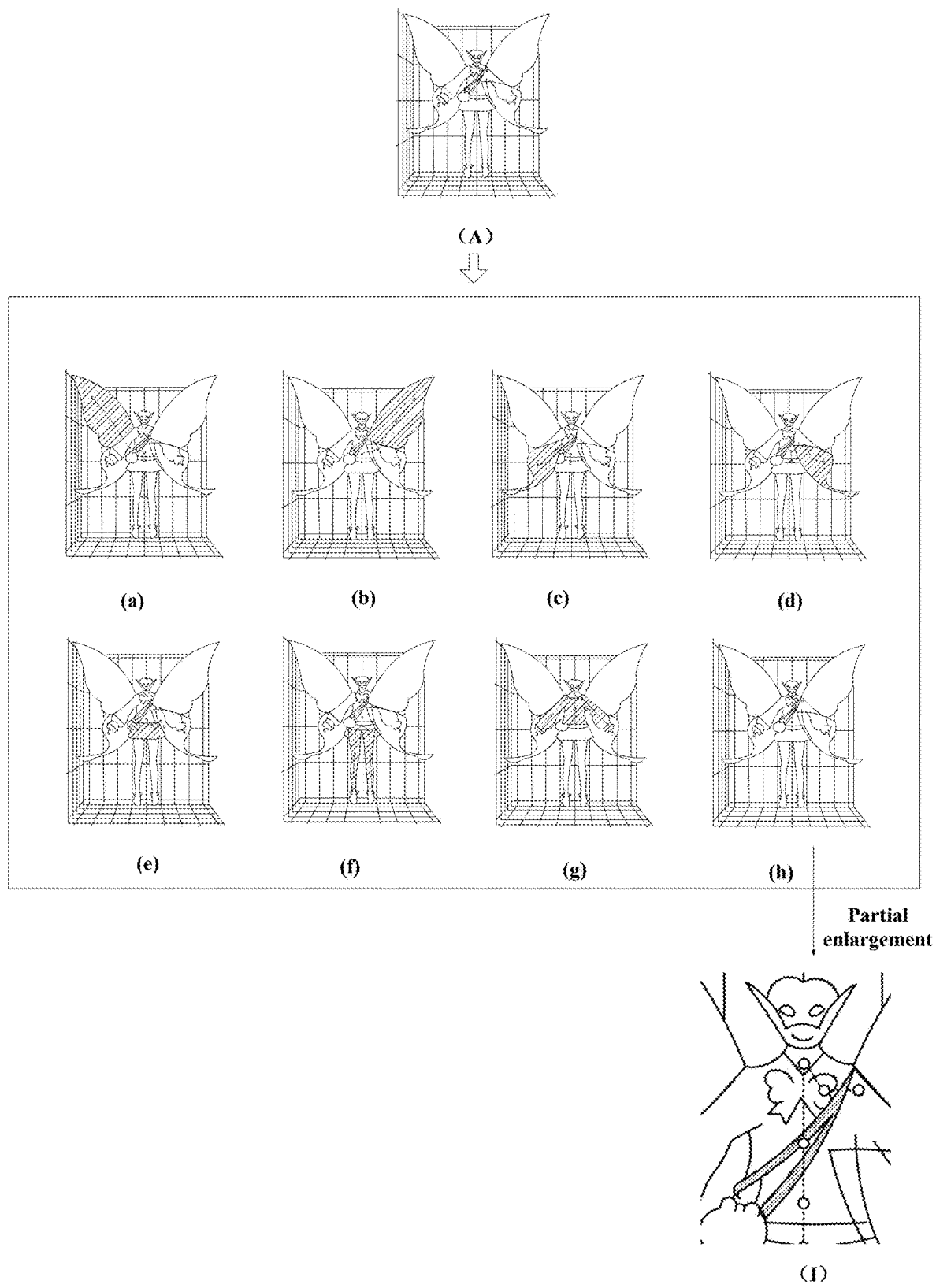
FIG. 6 is a diagram of unconnected subgraphs divided in some embodiments.

Each mesh region corresponding to the 3D mesh may correspond to a different limb part of the 3D object, the limb part including but not limited to a leg, an upper body, a hip, or a wing, and the like. The mesh regions corresponding to different limb parts may be unconnected subgraphs. As shown in FIG. 6, (A) shows a 3D object provided with a mesh costume; the mesh costume includes costume regions corresponding to wings, a skirt, an upper body, and legs. In a mesh graph of the mesh costume, the mesh regions corresponding to the wings, the skirt, the upper body, and the legs are unconnected subgraphs; each unconnected subgraph is shown in (a) to (h), oblique line regions in (a) to (h) being each unconnected subgraph. (a) to (d) are unconnected subgraphs corresponding to the four wings; (e) is an unconnected subgraph corresponding to the skirt; (f) is an unconnected subgraph corresponding to the legs; (g) is an unconnected subgraph corresponding to the upper body; (h) is an unconnected subgraph corresponding to the ribbon on the chest; and (I) is an enlarged view of a local region of (h), and it can be seen from (I) that the ribbon on the chest is displayed in oblique lines.

Specifically, the terminal may obtain the position of an abnormal vertex to obtain an abnormal vertex position, acquire the position of a mesh region based on the abnormal vertex position, and take the mesh region as an abnormal mesh region when the abnormal vertex position is in the position of the mesh region.

In some embodiments, there may be a plurality of abnormal mesh regions, specifically, there is a plurality of abnormal vertices. A mesh region of the 3D mesh is an unconnected subgraph; when mesh regions to which the abnormal vertices belong are different, the different mesh regions are taken as abnormal mesh regions. For example, when an abnormal vertex a belongs to an unconnected subgraph A, and an abnormal vertex b belongs to an unconnected subgraph B, the unconnected subgraph A and the unconnected subgraph B are taken as abnormal network regions separately.

In some embodiments, the terminal may take all vertices in the abnormal mesh regions as target vertices. The terminal may also filter the target vertex from the abnormal mesh region, for example, the distance between the vertex in the abnormal mesh region and the abnormal vertex may be calculated to obtain a vertex distance; and the target vertex is obtained by filtering based on the vertex distance. For example, the terminal may obtain, from each vertex in the abnormal mesh region, a vertex with a vertex distance less than a vertex distance threshold as the target vertex. The vertex distance threshold may be preset or set as desired.

In some embodiments, the terminal may acquire a 3D mesh sample and a skeletal structure sample corresponding to the 3D mesh sample, the 3D mesh sample, and the skeletal structure sample corresponding to the 3D mesh sample being used for training a local joint weight prediction model. Each unconnected subgraph is acquired from the 3D mesh sample; joints corresponding to the unconnected subgraph are acquired from the skeletal structure sample. A vertex feature corresponding to a vertex in the unconnected subgraph and a joint feature corresponding to the unconnected subgraph are used as training data of the local joint weight prediction model to train the local joint weight prediction model, obtaining the trained local joint weight prediction model. By dividing unconnected subgraphs, more and abundant training data can be constructed, which is helpful to improve the performance of the local model. The method of determining the joint corresponding to the unconnected subgraph is identical to the method of determining the candidate joint.

Figure 7:
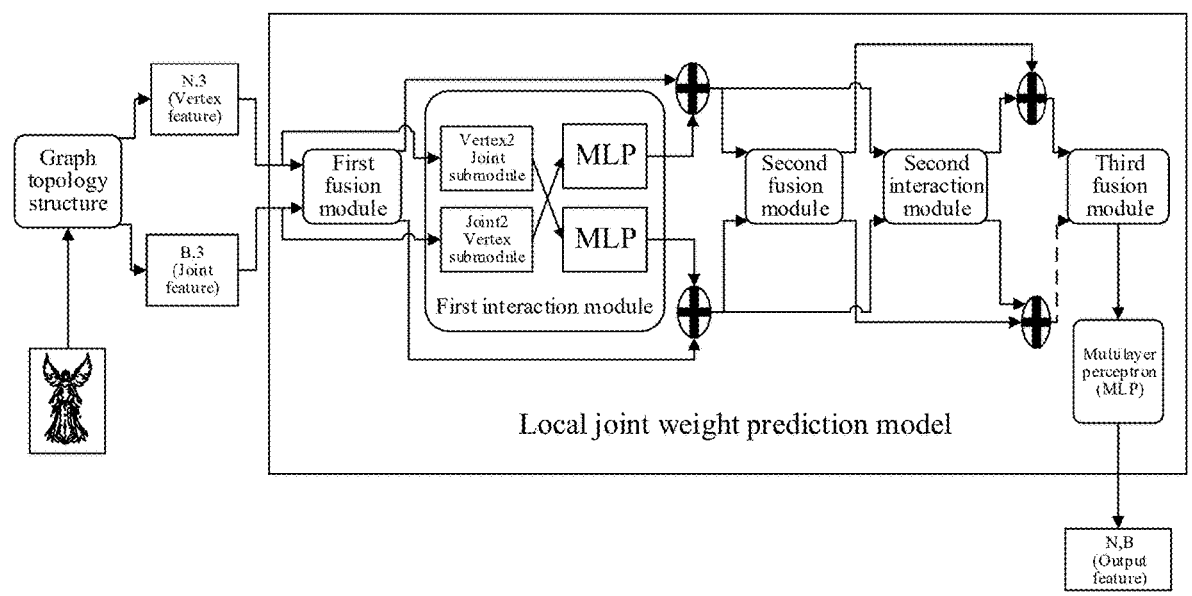
FIG. 7 is a diagram of a local joint weight prediction model in some embodiments.
Figure 8:
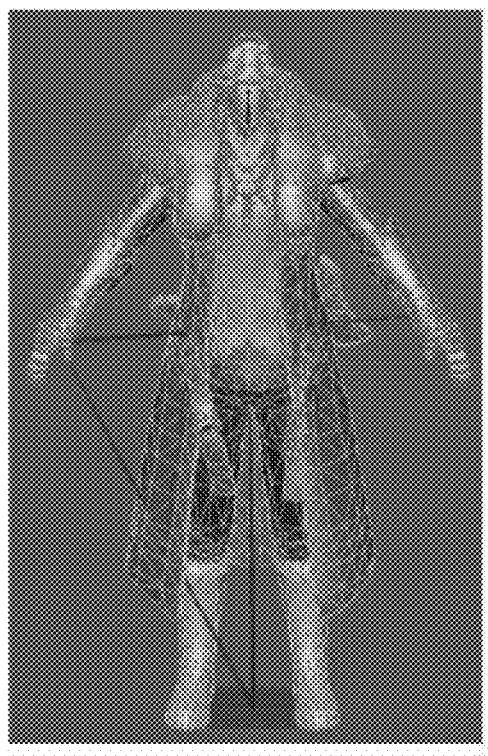
FIG. 8 is a diagram showing a skinning effect in some embodiments.

As shown in FIG. 7, it is a frame diagram of a local joint weight prediction model in some embodiments, and a graph topology structure is an input of the model. The graph topology structure may be represented as $G=(G_n,G_j)$, $G_n$ representing a graph topology structure corresponding to an unconnected subgraph M including N vertices, $G_j$ representing a graph topology structure of B joints corresponding to the unconnected subgraph M; $G_n=(V_n,E_n,A_n)$, $V_n$ representing a vertex in the unconnected subgraph M, E, EVEN representing a connecting edge in the unconnected subgraph M, and $A_n$ representing a vertex adjacency matrix corresponding to the unconnected subgraph M, the size of $A_n$ being an N by N matrix, and the value of each element in $A_n$ being 0 or 1; $G_j=(V_j,E_j,A_j)$, $V_j$ representing each of the B joints, $E_j$ representing a line segment (which may also be referred to as a connecting edge) between the joints, and $A_j$ representing a joint adjacency matrix corresponding to the B joints. As shown in FIG. 8, a 3D object is shown. The costume of the 3D object includes a plurality of triangles; each triangle is formed by connecting three vertices; each edge of the triangle is a line segment formed by connecting two vertices; and the three edges of the triangle are connecting edges.

The joint features and the vertex features may be represented in terms of positions in a coordinate system, for example, a vertex feature of a vertex $v_i$ may be represented as $p_i$, $p_i \in R^3$ representing the position of the vertex $v_i$ in a Cartesian coordinate system, represented by $(p_{ix}, p_{iy}, p_{iz})$, and $p_i$ being three dimensional. Likewise, the joint features of a joint $b_i$ may be represented as $s_i$, $s_i \in R^3$ representing the position of the joint bi in a Cartesian coordinate system, represented by $(s_{ix}, s_{iy}, s_{iz})$, and si being three dimensional. In FIG. 7, the input of the model includes two branches. One input is "N,3", "N,3" denoting that the input is vertex features of N vertices with the dimension of each vertex feature being 3. The other input is "B,3", "B,3" denoting that the input is joint features of B joints with the dimension of each joint feature being 3.

The output of the local joint weight prediction model is joint weight information corresponding to N vertices. The joint weight information of a vertex $v_i$ may be represented as $w_i \in R^B$, $w_i$ being a vector of dimension B; $w_{ij}$ is a $j^{th}$ element in $w_i$, representing the joint weight value of a $j^{th}$ joint in B joints; $\Sigma_j^{ij} w_{ij}=1$, $0 \le w_{ij} \le 1$, the size of the $w_{ij}$ value represents the degree of influence of rotation and translation of the $j^{th}$ joint on the vertex $v_i$ in the deformation process of the unconnected subgraph M. The joint weight value may be a probability, for example, a joint weight value corresponding to a joint is used for indicating the probability that the joint is an associated joint of vertices. The dimension of the feature output by the model is (N, B), namely, the output is a feature of N rows and B columns. An $i^{th}$ row in the output feature represents joint weight information corresponding to an $i^{th}$ vertex in the N vertices. Of course, the local joint weight prediction model, after obtaining the joint weight value corresponding to each vertex, may take a large joint weight value therein as an output, for example, the top three joint weight values may be output, to enhance the sparsity of the model predicting the joint weights and improve the degree of coincidence with the real joint weight values (for example, in a real situation, the number of joint weight values corresponding to one vertex is at most three).

In the embodiment, the target vertex to be locally predicted is determined based on each vertex in the abnormal mesh region, so that joint weight information of a plurality of vertices in the region can be further predicted, improving not only the accuracy of the joint weight information of the abnormal vertex but also the accuracy of the joint weight information around the abnormal vertex.

In some embodiments, the performing a local prediction based on a vertex feature of the target vertex to obtain local joint weight information of the target vertex includes: determining, for each target vertex, an adjacent joint having an adjacent relationship with the target vertex from the joints of the skeletal structure; performing feature fusion based on a joint feature of the adjacent joint and the vertex feature of the target vertex to obtain a first local prediction reference feature corresponding to the target vertex; and performing a local prediction based on the first local prediction reference feature to obtain the local joint weight information of the target vertex.

The local joint weight information includes a local associated joint associated with the target vertex and a local joint weight value corresponding to the local associated joint. The adjacent joint for the target vertex is a joint with a distance from the target vertex being less than an adjacent distance threshold. When the distance between the vertex and the joint is less than the adjacent distance threshold, it is determined that there is an adjacent relationship between the vertex and the joint. For the vertex and the joint with the adjacent relationship, the vertex is an adjacent vertex of the joint, and the joint is an adjacent joint of the vertex. The adjacent distance threshold may be preset or set as desired.

The adjacent joint of the target vertex may be selected from the candidate joints; the relationship between the target vertex and the candidate joint may be recorded by a connected matrix; and the adjacent joint corresponding to the target vertex may be determined by the connected matrix. For example, when the target vertex is a vertex in the above unconnected subgraph M and the candidate joints are the above M joints, the connected matrix $A_{mj}$ may be represented as $A_{mj} \in [0,1]^{N \times B}$, $A_{mj}$ being a matrix with N rows and B columns, and the value of an element in the matrix being 0 or 1; $A_{mj}[i,j]$ is an element in an $i^{th}$ row and $j^{th}$ column of the connected matrix $A_{mj}$, $A_{mj}[i,j]=1$ indicating that an $i^{th}$ vertex in the unconnected subgraph M is affected by a $j^{th}$ joint in the B joints, that is, the $j^{th}$ joint in the B joints is an adjacent joint of the $i^{th}$ vertex in the unconnected subgraph M; $A_{mj}[i,j]=0$ indicating that the $i^{th}$ vertex in the unconnected subgraph M is not affected by the $j^{th}$ joint in the B joint, that is, the $j^{th}$ joint in the B joint is not an adjacent joint of the $i^{th}$ vertex in the unconnected subgraph M. When a vertex is close to the spatial position of a joint, it is usually greatly affected by the joint, and the weight value of the vertex corresponding to the joint is also great, so the calculation method of the connected matrix $A_{mj}$ may be: calculating a distance, for example, Euclidean distance, from the target vertices to the candidate joints; arranging the candidate joints according to the distance from small to large; setting the elements corresponding to the first and second candidate joints in $A_{mj}$ to 1; and setting the elements of other candidate joints in $A_{mj}$ to 1.

The target vertex may have at least one adjacent joint. The first local prediction reference feature is a feature referenced in predicting local joint weight information of the target vertex. Feature fusion may include at least one of feature addition, which refers to adding values at the same position in a feature, or feature concatenation, which refers to concatenating features together.

Specifically, the terminal may perform feature fusion on a vertex feature of the target vertex and a joint feature of an adjacent joint of the target vertex, and use the fused result as a first local prediction reference feature corresponding to the target vertex. For example, the terminal may perform feature addition on the joint feature of the adjacent joint and features of the target vertex, and use the added result as a first local prediction reference feature corresponding to the target vertex.

In some embodiments, the target vertex has a plurality of adjacent joints. The terminal may perform feature concatenation on joint features of each adjacent joint of the target vertex, and perform feature addition on the concatenated features and the vertex features of the target vertex to obtain a first local prediction reference feature corresponding to the target vertex. It should be noted that in the present disclosure, when performing feature addition, if the dimensions of the features are inconsistent, the features are firstly scaled so that the dimensions of the features are consistent, and then feature addition is performed. For example, in the embodiment, when the dimension of the concatenated feature is inconsistent with that of the vertex feature, the dimension of the concatenated feature may be transformed into the dimension of the vertex feature and then performed feature addition with the vertex feature of the target vertex.

In some embodiments, the terminal may acquire neighbor vertices of the target vertex, which are vertices connected to the target vertex. Two vertices that are connected may be referred to as neighbor vertices of each other. For example, vertex i is connected to vertex j, then vertex i is a neighbor vertex of vertex j, and vertex j is also a neighbor vertex of vertex i. The terminal may perform feature fusion based on the vertex feature of the target vertex, the joint feature of the adjacent joint, and the vertex feature of the neighbor vertex to obtain a first local prediction reference feature corresponding to the target vertex.

In some embodiments, the terminal may predict joint weight values corresponding to each joint in the skeletal structure based on the first local prediction reference feature, and determine, from the joints, an associated joint of a target vertex based on the joint weight values as a local associated joint of the target vertex. For example, a joint with a joint weight value greater than a weight threshold may use as a local associated joint of the target vertex; or each joint may be arranged according to the joint weight values from large to small to obtain a joint sequence, and a joint with a joint ranking before the ranking threshold is acquired from the joint sequence as a local associated joint of the target vertex.

In some embodiments, the terminal may acquire a candidate joint of the target vertex from the skeletal structure. The candidate joint may be determined according to the target vertex, for example, the candidate joint may be selected from each joint of the skeletal structure based on a distance between the joint and the target vertex, for example, a joint with a distance to the target vertex less than a first distance threshold may be used as the candidate joint; or the candidate joint may be determined based on a mesh region in which the target vertex is located. The target vertex may have at least one candidate joint. The terminal may predict the joint weight value corresponding to each candidate joint according to the first local prediction reference feature, and select a candidate joint with a large joint weight value from each candidate joint based on the joint weight value as a local associated joint of the target vertex. The first distance threshold may be preset or set as desired.

In the embodiment, feature fusion is performed based on the joint feature of the adjacent joint and the vertex feature of the target vertex to obtain a first local prediction reference feature corresponding to the target vertex. The first local prediction reference feature covers features of the joints in addition to features of the vertices, thereby improving the accuracy of joint weight values predicted based on the first local prediction reference feature.

In some embodiments, the determining an adjacent joint having an adjacent relationship with the target vertex from the joints of the skeletal structure includes: determining a mesh region to which the target vertex belongs in the 3D mesh to obtain a target mesh region; acquiring a joint corresponding to the target mesh region from the joints of the skeletal structure to obtain a candidate joint; calculating a distance between the target vertex and each candidate joint; and selecting the adjacent joint having an adjacent relationship with the target vertex from each candidate joint based on the distance.

The target mesh region is a mesh region including a target vertex. When the mesh region in the 3D mesh is an unconnected subgraph, the target mesh region may be an unconnected subgraph including the target vertex, and the target mesh region may be the above abnormal mesh region.

The adjacent joint having an adjacent relationship with the target vertex may be a candidate joint satisfying a distance proximity condition in the candidate joints, the distance proximity condition including at least one of a distance being less than an adjacent distance threshold, or a joint ranking before a ranking threshold. The joint ranking refers to the ranking of candidate joints in a candidate joint sequence, the candidate joint sequence being a sequence obtained by ranking each candidate joint according to the distance from small to large. The smaller the distance, the more advanced the candidate joint is in the candidate joint sequence. The ranking threshold may be preset or set as desired, and may be, for example, 3. When the ranking threshold is 3, the candidate joints ranked at the first and second positions may be used as adjacent joints for the target vertex. The position of the candidate joints is in the spatial position occupied by the target mesh region.

Specifically, the terminal may determine a spatial region occupied by the target mesh region in the 3D space, and acquire the position of the joint in the 3D space. When the position of the joint in the 3D space belongs to the spatial region occupied by the target mesh region in the 3D space, the joint is determined to be a candidate joint corresponding to the target vertex. Each target vertex corresponds to one or a plurality of candidate joints, the plurality referring to at least two.

In some embodiments, the terminal may calculate a distance between the target vertex and the corresponding candidate joint to obtain a vertex joint distance, compare the vertex joint distance to an adjacent distance threshold, and use the candidate joint as an adjacent joint of the target vertex when the vertex joint distance is less than the adjacent distance threshold.

In some embodiments, the terminal may rank each candidate joint according to the order of the vertex joint distance from small to large, use the ranked sequence as a candidate joint sequence, and select, from the candidate joint sequence, a candidate joint with a joint ranking before the ranking threshold as an adjacent joint of the target vertex.

In the embodiment, the adjacent joint of the target vertex is selected from each candidate joint based on the distance, so that the joint closer to the target vertex can be taken as the adjacent joint of the target vertex. Since the joint closer to the target vertex has a greater influence on the target vertex, the joint with a greater influence on the target vertex can be taken as the adjacent joint of the target vertex, thereby improving the accuracy of the adjacent joint.

In some embodiments, the performing feature fusion based on a joint feature of the adjacent joint and the vertex feature of the target vertex to obtain a first local prediction reference feature corresponding to the target vertex includes: acquiring a vertex feature corresponding to a neighbor vertex of the target vertex as a neighbor vertex feature; and performing feature fusion based on the vertex feature of the target vertex, the joint feature of the adjacent joint, and the neighbor vertex feature to obtain the first local prediction reference feature corresponding to the target vertex.

The neighbor vertex of the target vertex may be determined based on a vertex adjacency matrix corresponding to a mesh region to which the target vertex belongs. For example, when the mesh region to which the target vertex belongs is the above unconnected subgraph M, the neighbor vertex of the target vertex may be determined from the vertex neighbor matrix $A_n$. When the element of an $i^{th}$ row and $j^{th}$ column in $A_n$ is 1, it means that an $i^{th}$ vertex and a $j^{th}$ vertex in the unconnected subgraph M are neighbor vertices of each other; and when the element of the $i^{th}$ row and $j^{th}$ column in $A_n$ is 0, it means that the $i^{th}$ vertex and the $j^{th}$ vertex in the unconnected subgraph M are not neighbor vertices of each other. The vertex neighbor matrix may be referred to as a vertex neighbor matrix.

Specifically, a neighbor vertex feature refers to a vertex feature of a neighbor vertex. The terminal may perform feature fusion on the vertex feature of the target vertex and the neighbor vertex feature firstly, and then perform feature fusion on the result of the feature fusion and the joint feature of the adjacent joint to obtain a first local prediction reference feature corresponding to the target vertex. The terminal may perform feature fusion on the vertex feature of the target vertex and the joint feature of the adjacent joint first, and then perform feature fusion on the fused result and the neighbor vertex feature to obtain a first local prediction reference feature corresponding to the target vertex.

In the embodiment, feature fusion is performed based on the vertex feature of the target vertex, the joint feature of the adjacent joint, and the neighbor vertex feature to obtain the first local prediction reference feature. Therefore, the first local prediction reference feature fuses more features, predicting accurately the joint weight, and improving the accuracy of predicting the joint weight.

In some embodiments, the performing feature fusion based on the vertex feature of the target vertex, the joint feature of the adjacent joint, and the neighbor vertex feature to obtain the first local prediction reference feature corresponding to the target vertex includes: determining a vertex feature difference between the neighbor vertex feature of the neighbor vertex and the vertex feature of the target vertex; concatenating the vertex feature difference and the vertex feature of the target vertex to obtain a vertex concatenation feature of the target vertex; and performing feature fusion based on the vertex concatenation feature and the joint feature of the adjacent joint to obtain the first local prediction reference feature corresponding to the target vertex.

The vertex feature difference refers to a difference between the vertex feature of the target vertex and the neighbor vertex feature. The feature may be represented by a vector, and the feature may include a plurality of eigenvalues, each eigenvalue being ordered.

Specifically, for each neighbor vertex of the target vertex, the terminal may subtract the neighbor vertex feature from the eigenvalue of the corresponding position in the vertex feature of the target vertex to obtain a vertex feature difference. For example, the terminal may determine a difference between eigenvalues at the same position in a neighbor vertex feature and the vertex feature of a target vertex to obtain eigenvalue differences, arrange the eigenvalue differences according to the positions of the eigenvalues in the feature (for example, the neighbor vertex feature), and take the arranged sequence as the vertex feature difference.

In some embodiments, the terminal may concatenate the vertex feature difference with the vertex feature of the target vertex, and use the concatenated result as the vertex concatenation feature of the target vertex. The terminal may perform feature addition on the vertex concatenation feature and the joint feature of the adjacent joint corresponding to the target vertex to obtain a first local prediction reference feature corresponding to the target vertex. When the target vertex has a plurality of adjacent joints, the terminal may perform feature fusion, such as feature concatenation, on the joint feature of each adjacent joint to obtain an adjacent fusion feature, and perform feature addition on the adjacent fusion feature and the vertex concatenation feature to obtain a first local prediction reference feature corresponding to the target vertex.

In some embodiments, the terminal may perform at least one of convolution processing or scaling processing on the vertex concatenation feature to obtain the processed vertex concatenation feature, for example, the terminal may first perform convolution processing on the vertex concatenation feature to obtain the processed vertex concatenation feature. The terminal may perform feature fusion based on the processed vertex concatenation feature and the joint feature of the adjacent joint to obtain a first local prediction reference feature corresponding to the target vertex.

In some embodiments, the terminal may perform feature addition on the processed vertex concatenation feature and the joint feature of the adjacent joint, and use the added result as a first local prediction reference feature corresponding to the target vertex. When the target vertex has a plurality of neighbor vertices, the terminal may perform a statistical operation on the processed vertex concatenation feature corresponding to each neighbor vertex to obtain a neighbor vertex statistical feature, perform feature addition based on the neighbor vertex statistical feature and the joint feature of the adjacent joint, and take the added result as a first local prediction reference feature corresponding to the target vertex. For example, the terminal may perform feature addition on the neighbor vertex statistical feature and the joint feature of the adjacent joint, and take the added result as a first local prediction reference feature corresponding to the target vertex; or the terminal may perform feature addition on the adjacent fusion feature and the neighbor vertex statistical feature, and take the added result as a first local prediction reference feature corresponding to the target vertex.

Statistical operations include, but are not limited to, a maximum operation, a mean operation, a minimum operation, and a variance operation. Statistical operations are performed on eigenvalues of the same position, and the results of the statistical operations at various positions are arranged to obtain a neighbor vertex statistical feature. Taking the maximum operation as an example, if there are two neighbor vertices, and the processed vertex concatenation features corresponding to the two neighbor vertices are $S1=[0.1,0.2,0.3]$ and $S2=[0.4,0.5,0.6]$, the maximum operation is performed on the first eigenvalue 0.1 in S1 and the first eigenvalue 0.4 in S2 to obtain 0.4; the maximum operation is performed on the second eigenvalue 0.2 in S1 and the second eigenvalue 0.5 in S2 to obtain 0.5; the maximum operation is performed on the third eigenvalue 0.3 in S1 and the third eigenvalue 0.6 in S2 to obtain 0.6; the result of the maximum operation of the first bit 0.4, the result of the maximum operation of the second bit 0.5, and the result of the maximum operation of the third bit 0.6 are arranged to obtain $[0.4,0.5,0.6]$; and the arranged $[0.4,0.5, 0.6]$ is taken as a neighbor vertex statistical feature.

In some embodiments, the terminal may obtain a first local prediction reference feature using a local joint weight prediction model. As shown in FIG. 7, the local joint weight prediction model includes three fusion modules, which are a first fusion module, a second fusion module, and a third fusion module, and further includes two interaction modules, which are a first interaction module and a second interaction module; each fusion module has the same function. For the vertex, the fusion module is used for fusing the feature corresponding to the input vertex and the feature corresponding to the neighbor vertex corresponding to the input vertex; and for the joint, the fusion module is used for fusing the feature corresponding to the input joint and the feature corresponding to the neighbor joint of the joint. The terminal may obtain a first local prediction reference feature corresponding to the target vertex through the first fusion module and the first interaction module.

Figure 9:
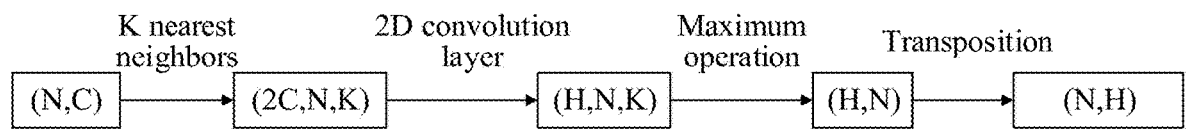
FIG. 9 is a schematic diagram of a fusion module performing feature fusion in some embodiments.

FIG. 9 is a schematic diagram of a fusion module performing feature fusion in some embodiments. The fusion module in FIG. 9 is illustrated as a first fusion module, assuming that a mesh region to which the target vertex belongs is the above unconnected subgraph M, and the dimension of the vertex feature is C; (N,C) in the drawing represents a matrix of N rows and C columns (referred to as a vertex matrix), each row in the vertex matrix representing a vertex feature and the vertex matrix including vertex features corresponding to N vertices in the unconnected subgraph M; the fusion module can acquire a neighbor vertex corresponding to the vertex from the vertex matrix. Neighbor vertices may be obtained, for example, based on the k nearest neighbors (KNN) principle; KNN means acquiring k nearest neighbors of the vertex, for example, acquiring k neighbor vertices of the target vertex $v_i$. For each vertex in $\{v_{i1}, v_{i2}, \ldots, v_{ik}\}$, if it is determined, according to the vertex neighbor matrix, that there are more than k neighbor vertices of the target vertex $v_i$, k neighbor vertices are taken out randomly from the neighbor vertices of the target vertex $v_i$; and if it is determined, according to the vertex neighbor matrix, that there are less than k neighbor vertices of the target vertex $v_i$, the target vertex $v_i$ is used to supplement to k, namely, taking the target vertex $v_i$ as its own neighbor vertex, thereby supplementing to the k neighbor vertices.

After obtaining k neighbor vertices $\{v_{i1}, v_{i2}, \ldots, v_{ik}\}$, vertex features corresponding to each neighbor vertex in $\{v_{i1}, v_{i2}, \ldots, v_{ik}\}$ are acquired, and $\{x_{i1}, x_{i2}, \ldots x_{ik}\}$ are obtained; the vertex features of each neighbor vertex in $\{x_{i1}, x_{i2}, \ldots x_{ik}\}$ are calculated by a difference with a vertex feature $x_i$ of a target vertex $v_i$ to obtain each vertex feature difference $\{x_{i1}-x_i, x_{i2}-x_i, \ldots x_{ik}-x_i\}$; each vertex feature difference in $\{x_{i1}-x_i, x_{i2}-x_i, \ldots x_{ik}-x_i\}$ is concatenated with the vertex feature $x_i$ of the target vertex $v_i$ to obtain a vertex concatenation feature, for example, a vertex feature difference $x_{ik}-x_i$ is concatenated with the vertex feature $x_i$ to obtain a vertex concatenation feature $h(x_i,x_{ik})=(x_{ik}-x_i)\|x_i$. The ∥ operation refers to a concatenation operation. Since the dimension of the vertex concatenation feature $h(x_i,x_{ik})=(x_{ik}-x_i)\|x_i$ is 2C, one target vertex has k vertex concatenation features and N target vertices, a matrix (2C,N,k) is obtained after the concatenation operation, (2C,N,k) representing a matrix with the dimension of 2C by N by k. The matrix includes k vertex concatenation features corresponding to each target vertex.

"Conv 2D" in the drawing represents a two-dimensional (2D) convolution layer. After obtaining the matrix (2C,N,k), the matrix (2C,N,k) is input into the 2D convolution layer for convolution processing to obtain a matrix (H,N,k). (H,N,k) includes k convolution-processed vertex concatenation features corresponding to each target vertex, and H is a dimension of the convolution-processed vertex concatenation features. The convolution-processed vertex concatenation features refer to features of the vertex concatenation features obtained after the convolution processing of the 2D convolution layer.

"Max" in the drawing refers to performing a maximum operation on k convolution-processed vertex concatenation features of the target vertex to obtain a neighbor vertex statistical feature corresponding to the target vertex. A matrix (H,N) in the drawing includes neighbor vertex statistical features corresponding to N target vertices, and the dimension of each neighbor vertex statistical feature is H. "Transpose" is used for transposing the matrix (H,N) to obtain a matrix (N,H). The matrix (H,N) is a matrix with H rows and N columns, each column of the matrix (H,N) representing a neighbor vertex statistical feature; and the matrix (N,H) is a matrix with N rows and H columns, each row of the matrix (N,H) representing a neighbor vertex statistical feature. In summary, the output of the first fusion module may be represented as $g=\max(Wh(x_i,x_{i1}),Wh(x_i,x_{i2}), \ldots, Wh(x_i,x_{ik}))$, g representing an output of the first fusion module, and $W \in \mathbb{R}^{2C \times H}$ being a learnable weight matrix parameter of the 2D convolution layer.

After obtaining the neighbor vertex statistical feature of the target vertex, the terminal may use the first interaction module to obtain the adjacent joint of the target vertex and calculate an adjacent fusion feature. As shown in FIG. 7, the interaction module may associate the vertex feature with the joint feature via a connected matrix $A_{mj} \in [0,1]^{N \times B}$ to aggregate the two features, thus improving the expression ability of the model feature. The first interaction module, as shown in FIG. 7, includes a vertex joint interaction submodule (Vertex2Joint submodule) and a joint vertex interaction submodule (Joint2Vertex submodule). The Vertex2Joint submodule is followed by a multilayer perceptron (MLP); and the Joint2Vertex submodule is followed by a MLP layer, and the Joint2Vertex submodule is used for taking a joint in the connected matrix that has an influence on the target vertex as an adjacent joint of the target vertex. After obtaining the adjacent joint of the target vertex, the Joint2Vertex submodule may further aggregate the joint feature of each adjacent joint, namely, feature concatenation, and input the result of feature concatenation into the MLP layer for feature mapping to obtain an adjacent fusion feature. For example, the Joint2Vertex submodule determines, based on $A_{mj} \in [0, 1]^{N \times B}$, that the joints having an influence on the target vertex (namely, adjacent joints) are $b_{i1}$ and $b_{i2}$, the joint feature of $b_{i1}$ being $f_{bi1}$ and the joint feature of $b_{i2}$ being $f_{bi2}$, and concatenates the $f_{bi1}$ and the $f_{bi2}$, and inputs the concatenated result into the MLP layer for feature mapping so as to obtain $F_{vj}=MLP((f_{bi1}\|f_{bi2}),W)$, W being a weight learning parameter of the MLP and $F_{vj}$ being an adjacent fusion feature. In FIG. 7, the module with a cross in a circle is a module for performing feature addition. The terminal may perform feature addition on the adjacent fusion feature and the neighbor vertex statistical feature, and take the added result as a first local prediction reference feature corresponding to the target vertex.

In the embodiment, since the vertex feature difference between the neighbor vertex feature and the vertex feature of the target vertex can reflect the difference between the neighbor vertex feature and the vertex feature of the target vertex, the vertex feature difference is concatenated with the vertex feature of the target vertex to obtain a vertex concatenation feature, making the vertex concatenation feature cover different places in the neighbor vertex feature from the vertex feature, and further making the vertex concatenation feature cover more abundant features, which is helpful to improve the accuracy of joint weight detection.

In some embodiments, the performing a local prediction based on the first local prediction reference feature to obtain the local joint weight information of the target vertex includes: acquiring, for each adjacent joint of the target vertex, a target vertex having an adjacent relationship with the adjacent joint from each target vertex to be locally predicted, and obtaining an adjacent vertex corresponding to the adjacent joint; performing feature fusion based on the joint feature of the adjacent joint and a vertex feature of the adjacent vertex to obtain a joint fusion feature corresponding to the adjacent joint; performing feature fusion based on the joint fusion feature of the adjacent joint and the first local prediction reference feature to obtain a second local prediction reference feature corresponding to the target vertex; and performing a local prediction based on the second local prediction reference feature to obtain the local joint weight information of the target vertex.

The adjacent relationship refers to a relationship with a distance less than the adjacent distance threshold. When the distance between the vertex and the joint is less than the adjacent distance threshold, it is determined that there is an adjacent relationship between the vertex and the joint. For the vertex and the joint with the adjacent relationship, the vertex is an adjacent vertex of the joint, and the joint is an adjacent joint of the vertex.

The joint fusion feature fuses a feature of an adjacent joint and a vertex feature of an adjacent vertex of the adjacent joint. Each joint, for example, each candidate joint, may have corresponding joint fusion features, and the steps for obtaining joint fusion features may refer to the method provided in the embodiment.

Specifically, the adjacent joint corresponds to at least one adjacent vertex. The terminal may perform feature addition on a joint feature of the adjacent joint and a vertex feature of the adjacent vertex corresponding thereto to obtain a joint fusion feature corresponding to the adjacent joint. When the adjacent joint has a plurality of adjacent vertices, the terminal may perform a statistical operation on the vertex feature of each adjacent vertex to obtain a vertex statistical feature, and perform feature addition on the vertex statistical feature and the joint feature of the adjacent joint, and take the added result as a joint fusion feature corresponding to the adjacent joint. Statistical operations include, but are not limited to, a maximum operation, a minimum operation, a variance operation, or a mean operation.

In some embodiments, the terminal may perform feature addition on the joint fusion feature of the adjacent joint and the first local prediction reference feature of the target vertex to obtain a second local prediction reference feature corresponding to the target vertex.

In some embodiments, the terminal may acquire a neighbor vertex corresponding to the target vertex from each target vertex, acquire a first local prediction reference feature of the neighbor vertex, and perform feature fusion on the first local prediction reference feature of the neighbor vertex and the first local prediction reference feature of the target vertex to obtain a local prediction fusion feature corresponding to the target vertex. The terminal may perform feature fusion on the local prediction fusion feature corresponding to the target vertex and the joint fusion feature of the adjacent joint of the target vertex to obtain a second local prediction reference feature corresponding to the target vertex. Each target vertex may have corresponding second local prediction reference features, and the steps for obtaining the second local prediction reference features may all refer to the method provided in the embodiment.

In some embodiments, the terminal may perform joint weight prediction based on the second local prediction reference feature of the target vertex, determine joint weight values corresponding to each candidate joint, and take a candidate joint with a joint weight value greater than a weight threshold as a local associated joint of the target vertex, and take a joint weight of the local associated joint as a local joint weight value.

In the embodiment, feature fusion is performed based on the joint feature of the adjacent joint and the vertex feature of the adjacent vertex to obtain the joint fusion feature of the adjacent joint, so that the joint fusion feature not only cover the joint feature but also cover the vertex feature. Therefore, feature fusion is performed based on the joint fusion feature of the adjacent joint and the first local prediction reference feature of the target vertex, so that the features in the obtained second local prediction reference feature are more abundant, thereby improving the accuracy of joint weight information predicted based on the second local prediction reference feature.

In some embodiments, the performing feature fusion based on the joint feature of the adjacent joint and a vertex feature of the adjacent vertex to obtain a joint fusion feature corresponding to the adjacent joint includes: performing a statistical operation on the vertex feature of each adjacent vertex to obtain a vertex statistical feature; and performing feature fusion based on the joint feature of the adjacent joint and the vertex statistical feature to obtain the joint fusion feature corresponding to the adjacent joint.

Statistical operations include, but are not limited to, a maximum operation, a minimum operation, a variance operation, or a mean operation.

Specifically, the terminal may perform a maximum operation on the vertex feature of each adjacent vertex of the adjacent joint to take the operated result as a maximum vertex statistical feature, and may perform a mean operation on the vertex feature of each adjacent vertex to obtain a mean vertex statistical feature. The vertex statistical feature is obtained based on the maximum vertex statistical feature and the mean vertex statistical feature, for example, may perform feature concatenation on the maximum vertex statistical feature and the mean vertex statistical feature to obtain the vertex statistical feature corresponding to the adjacent joint. Each joint in the candidate joints may employ the method of the embodiment to obtain corresponding vertex statistical features.

In some embodiments, the terminal may use the Vertex2Joint submodule to obtain the vertex statistical feature corresponding to the joint. For example, for each joint in the above B joints, the Vertex2Joint submodule may acquire each target vertex affected by the joint from the above N target vertices according to the connected matrix $A_{mj} \in [0,1]^{N \times B}$ as adjacent vertices of the joint, for example, obtaining each adjacent vertex $\{v_{i1}, v_{i2}, \ldots, v_{im}\}$ of the joint $b_j$. Since the number of target vertices affected by each joint, namely, the number of adjacent vertices, may be different, the Vertex2Joint submodule may perform a maximum operation on the vertex feature of each target vertex in $\{v_{i1}, v_{i2}, \ldots, v_{im}\}$, and perform a mean operation on the vertex feature of each target vertex in $\{v_{i1}, v_{i2}, \ldots, v_{im}\}$, concatenate the result of the maximum operation and the result of the mean operation, and input the concatenated result into the MLP layer for feature mapping so as to obtain a vertex statistical feature corresponding to the joint $b_j$. The vertex statistical feature may be represented as:

$$F_{bj} = MLP\left(\left(\max_{vi \in I(b_j)} (f_{vi})\right) \| \left(\operatorname*{mean}_{vi \in I(b_j)} (f_{vi})\right), W\right)$$

$F_{bj}$ represents a vertex statistical feature; $I(b_j) = \{v_i | A_{mj}[i, j] = 1\}$ represents each adjacent vertex $\{v_{i1}, v_{i2}, \ldots, v_{im}\}$; W is a weight learning parameter of the MLP; and $f_{vi}$ represents the vertex features of the adjacent vertex.

In some embodiments, the terminal may perform feature addition on the vertex statistical feature and the joint feature of the adjacent joint, and use the added result as a joint fusion feature corresponding to the adjacent joint.

In the embodiment, a statistical operation is performed on the vertex feature of the adjacent vertex, and feature fusion is performed using the vertex statistical feature obtained by statistics and the joint feature of the adjacent joint, thereby improving the accuracy of the joint fusion feature obtained by fusion.

In some embodiments, the performing feature fusion based on the joint feature of the adjacent joint and the vertex statistical feature to obtain the joint fusion feature corresponding to the adjacent joint includes: acquiring a joint feature of a neighbor joint corresponding to an adjacent joint as a neighbor joint feature; performing feature fusion on the joint feature of the adjacent joint and the neighbor joint feature to obtain a preliminary fusion feature corresponding to the adjacent joint; and performing feature fusion on the preliminary fusion feature corresponding to the adjacent joint and the vertex statistical feature to obtain the joint fusion feature corresponding to the adjacent joint.

Two joints with a connection relationship in a skeletal structure are mutually referred to as neighbor joints, for example, joint 1 is connected to joint 2, then joint 1 is a neighbor joint of joint 2, and joint 2 is also a neighbor joint of joint 1. The adjacent joint of the target vertex may have at least one neighbor joint. The adjacent joint of the target vertex may be determined from the candidate joints, and the neighbor joint corresponding to the adjacent joint of the target vertex may also be determined from the candidate joints.

Specifically, the terminal may acquire a candidate joint having a connection relationship with the adjacent joint of the target vertex from the candidate joints, and obtain a neighbor joint of the adjacent joint. For each adjacent joint of the target vertex, the terminal may perform feature concatenation or feature addition on the features of the adjacent joint and the corresponding features of the neighbor joint to obtain a preliminary fusion feature corresponding to the adjacent joint.

In some embodiments, the terminal may calculate a difference between the joint feature of the neighbor joint and the joint feature of the adjacent joint to obtain a joint feature difference, and perform feature concatenation on the joint feature difference and the joint feature of the adjacent joint to obtain a preliminary fusion feature corresponding to the adjacent joint. Each joint in the candidate joints may employ the method of the embodiment to obtain a corresponding preliminary fusion feature. The preliminary fusion feature may be obtained using the first fusion module in FIG. 7. The first fusion module treats the vertices in the same manner as the joints.

In some embodiments, the terminal may perform feature addition on the preliminary fusion feature of the adjacent joint and the vertex statistical feature corresponding to the adjacent joint to obtain a joint fusion feature corresponding to the adjacent joint.

In the embodiment, feature fusion is performed on the joint feature of the adjacent joint and the neighbor joint feature to obtain a preliminary fusion feature corresponding to the adjacent joint; and feature fusion is performed on the preliminary fusion feature corresponding to the adjacent joint and the vertex statistical feature to obtain a joint fusion feature corresponding to the adjacent joint, thereby improving the accuracy of the joint fusion feature.

In some embodiments, the performing feature fusion based on the joint fusion feature of the adjacent joint and the first local prediction reference feature to obtain a second local prediction reference feature corresponding to the target vertex includes: determining a neighbor vertex of the target vertex, and acquiring a first local prediction reference feature corresponding to the neighbor vertex; performing feature fusion based on the first local prediction reference feature of the target vertex and the first local prediction reference feature of the neighbor vertex to obtain a local prediction fusion feature corresponding to the target vertex; and performing feature fusion on the local prediction fusion feature and the joint fusion feature of the adjacent joint to obtain the second local prediction reference feature corresponding to the target vertex.

Specifically, the terminal may acquire, from each target vertex, a vertex having a connection relationship with the target vertex as a neighbor vertex of the target vertex. The terminal may calculate a difference between the first local prediction reference feature of the neighbor vertex and the first local prediction reference feature of the target vertex to obtain a first reference feature difference, perform feature concatenation on the first reference feature difference and the first local prediction reference feature of the target vertex to obtain a first reference concatenation feature, and obtain a local prediction fusion feature based on the first reference concatenation feature. For example, the terminal may perform convolution processing on the first reference concatenation feature to obtain a local prediction fusion feature corresponding to the target vertex. For example, the terminal may use the second fusion module in FIG. 7 to obtain the local prediction fusion feature corresponding to the target vertex.

In some embodiments, the terminal may perform feature addition on the local prediction fusion feature of the target vertex and the joint fusion feature of the adjacent joint of the target vertex to obtain a second local prediction reference feature corresponding to the target vertex.

In some embodiments, when the target vertex has a plurality of adjacent joints, the terminal may first perform feature concatenation on the joint fusion feature of each adjacent joint, and perform feature addition on the result of the feature concatenation and the local prediction fusion feature of the target vertex to obtain a second local prediction reference feature corresponding to the target vertex. Each target vertex may use the method of the embodiment to obtain a corresponding second local prediction reference feature. For example, the terminal may obtain a second local prediction reference feature corresponding to the target vertex using the second interaction module in FIG. 7.

In the embodiment, feature fusion is performed on the local prediction fusion feature and the joint fusion feature of the associated adjacent joint to obtain a second local prediction reference feature corresponding to the target vertex, thereby improving the accuracy of the second local prediction reference feature.

In some embodiments, the performing a local prediction based on the second local prediction reference feature to obtain the local joint weight information of the target vertex includes: determining a neighbor vertex of the target vertex, and acquiring a second local prediction reference feature corresponding to the neighbor vertex; performing feature fusion on the second local prediction reference feature corresponding to the target vertex and the second local prediction reference feature of the neighbor vertex to obtain a target local prediction reference feature corresponding to the target vertex; and performing a local prediction based on the target local prediction reference feature to obtain the local joint weight information of the target vertex.

Specifically, the terminal may acquire, from each target vertex, a vertex having a connection relationship with the target vertex as a neighbor vertex of the target vertex. The terminal may calculate a difference between the second local prediction reference feature of the neighbor vertex and the second local prediction reference feature of the target vertex to obtain a second reference feature difference, perform feature concatenation on the second reference feature difference and the second local prediction reference feature of the target vertex to obtain a second reference concatenation feature, and obtain a target local prediction reference feature based on the second reference concatenation feature. For example, the terminal may perform convolution processing on the second reference concatenation feature to obtain the target local prediction reference feature corresponding to the target vertex. For example, the terminal may use the third fusion module in FIG. 7 to process the second local prediction reference feature to obtain the target local prediction reference feature corresponding to the target vertex. The input of the third fusion module in FIG. 7 does not include a branch represented by a dashed arrow. In the embodiment, feature concatenation is performed on the second reference feature difference and the second local prediction reference feature of the target vertex to obtain a second reference concatenation feature, and a target local prediction reference feature is obtained based on the second reference concatenation feature, thus improving the expression ability of the target local prediction reference feature.

In some embodiments, the terminal may perform joint weight prediction based on the target local prediction reference feature of the target vertex, determine joint weight values corresponding to each candidate joint, and take a candidate joint with a joint weight value greater than a weight threshold value as a local associated joint of the target vertex, and take a joint weight of the local associated joint as a local joint weight value. For example, in FIG. 7, the terminal may input the target local prediction reference feature into MLP after the third fusion module for prediction of joint weights. With the method of the embodiment, local joint weight information corresponding to each target vertex may be obtained. It should be noted that when the target vertices are different, the joint weight values of the same candidate joint may be different, for example, the result of predicting the target vertex A is that the joint 1 has a weight of 0.3, and the result of predicting the target vertex B is that the joint 1 has a weight of 0.6.

In the embodiment, feature fusion is performed on the second local prediction reference feature corresponding to the target vertex and the second local prediction reference feature of the neighbor vertex to obtain a target local prediction reference feature corresponding to the target vertex; and based on the target local prediction reference feature, a local associated joint associated with the target vertex and a local joint weight value corresponding to the local associated joint are predicted, improving the accuracy of the predicted local joint weight information.

Figure 10:
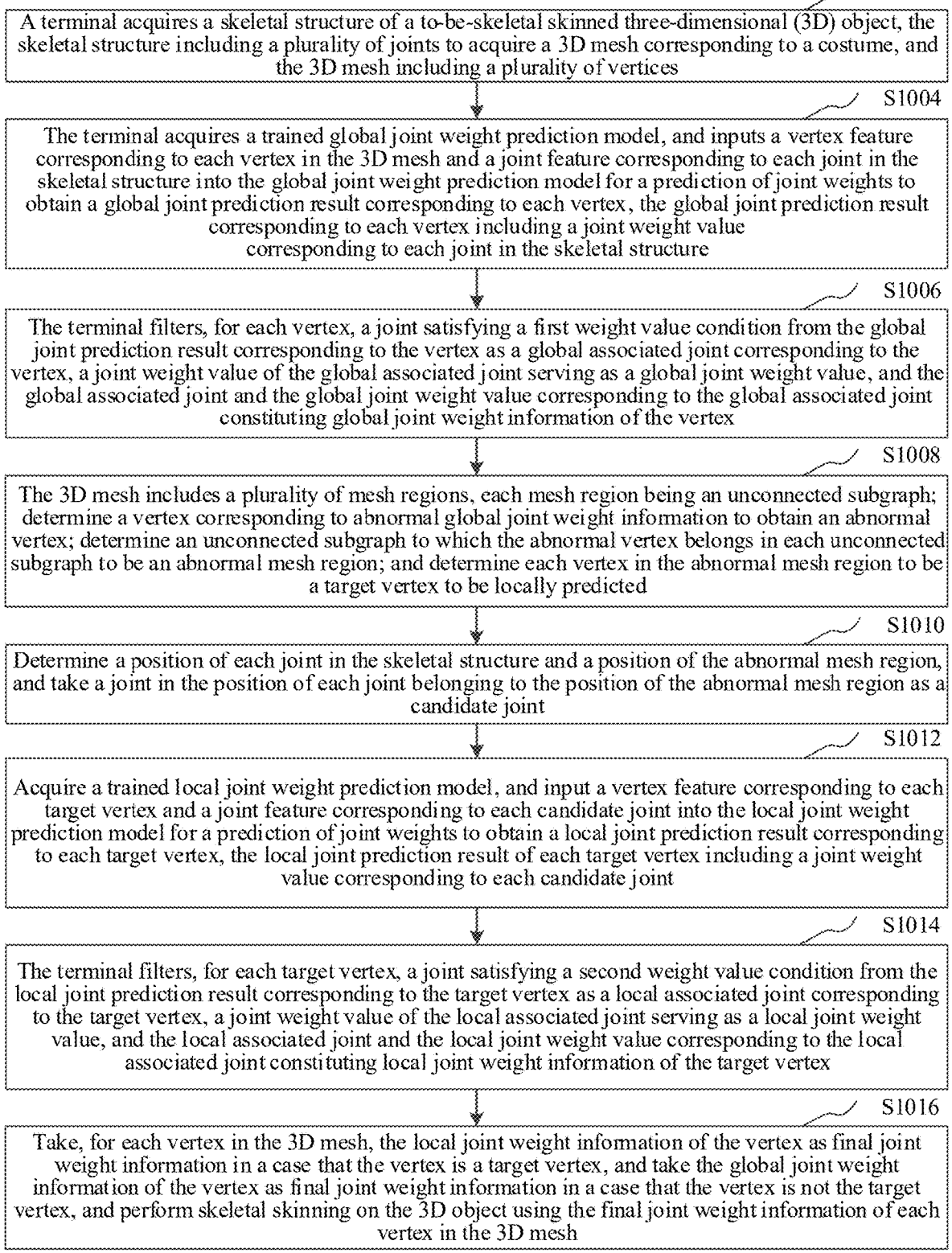
FIG. 10 is a flow diagram of a skinning method in some embodiments.

The present disclosure further provides an application scene applying the above skinning method for skinning of a 3D object in a game or animation. Specifically, as shown in FIG. 10, the application of the skinning method in the present disclosure scene is as follows:

Step S1002: A terminal acquires a skeletal structure of a to-be-skeletal skinned 3D object, the skeletal structure including a plurality of joints to acquire a 3D mesh corresponding to a costume, and the 3D mesh including a plurality of vertices.

Step S1004: The terminal acquires a trained global joint weight prediction model, and inputs a vertex feature corresponding to each vertex in the 3D mesh and a joint feature corresponding to each joint in the skeletal structure into the global joint weight prediction model for a prediction of joint weights to obtain a global joint prediction result corresponding to each vertex, the global joint prediction result corresponding to each vertex including a joint weight value corresponding to each joint in the skeletal structure.

Step S1006: The terminal filters, for each vertex, a joint satisfying a first weight value condition from the global joint prediction result corresponding to the vertex as a global associated joint corresponding to the vertex, a joint weight value of the global associated joint serving as a global joint weight value, and the global associated joint and the global joint weight value corresponding to the global associated joint constituting global joint weight information of the vertex.

The first weight value condition may include the joint weight value being greater than a weight threshold or the joint ranking being before a ranking threshold. The weight threshold may be preset or set as desired. The joint ranking refers to the ranking of joints in a joint sequence, the joint sequence being a sequence obtained by arranging each joint in the skeletal structure according to the joint weight values from large to small. The ranking threshold may be preset or set as desired, and may be, for example, 4.

Step S1008: The 3D mesh includes a plurality of mesh regions, each mesh region being an unconnected subgraph; determine a vertex corresponding to abnormal global joint weight information to obtain an abnormal vertex; determine an unconnected subgraph to which the abnormal vertex belongs in each unconnected subgraph to be an abnormal mesh region; and determine each vertex in the abnormal mesh region to be a target vertex to be locally predicted.

Step S1010: Determine a position of each joint in the skeletal structure and a position of the abnormal mesh region, and take a joint in the position of each joint belonging to the position of the abnormal mesh region as a candidate joint.

Step S1012: Acquire a trained local joint weight prediction model, and input a vertex feature corresponding to each target vertex and a joint feature corresponding to each candidate joint into the local joint weight prediction model for a prediction of joint weights to obtain a local joint prediction result corresponding to each target vertex, the local joint prediction result of each target vertex including a joint weight value corresponding to each candidate joint.

Step S1014: The terminal filters, for each target vertex, a joint satisfying a second weight value condition from the local joint prediction result corresponding to the target vertex as a local associated joint corresponding to the target vertex, a joint weight value of the local associated joint serving as a local joint weight value, and the local associated joint and the local joint weight value corresponding to the local associated joint constituting local joint weight information of the target vertex.

The method for determining the second weight value condition may refer to the method for determining the first weight value condition.

Step S1016: Take, for each vertex in the 3D mesh, the local joint weight information of the vertex as final joint weight information when the vertex is a target vertex, and take the global joint weight information of the vertex as final joint weight information when the vertex is not the target vertex, and perform skinning on the 3D object using the final joint weight information of each vertex in the 3D mesh.

In the embodiment, the joint weight is predicted using both the global joint weight prediction model and the local joint weight prediction model, so that an interactive method of vertex joint weight prediction based on the global model and the local model is implemented, which effectively solves the problems of vertex joint weight mis-binding in partial regions and inner and outer layer insertion of the mesh in complex costume skinning. In addition, artists may interact with the local model to constantly optimize the region with poor vertex skinning effect in local region of the complex costume, and may flexibly adjust the joint weight distribution of the vertex to achieve the desired effect, so that the skinning effect is more controllable. The skinning method provided in the present disclosure is applicable to the prediction of vertex joint weight distribution of costumes with different bone structures and different mesh accuracies, with strong versatility.

The skinning method provided in the present disclosure is further applicable to other scenes, for example, the method may be applied to a construction scene to perform skinning for a virtual building in the construction scene. The virtual building may include a skeleton and a surface substance; a skeletal structure may be obtained according to the skeleton of the virtual building, and a 3D mesh may be obtained according to the surface substance of the virtual building. The virtual building is skinned using the skinning method provided in the present disclosure to obtain a skinned virtual building. After obtaining the skinned virtual building, the virtual building may be adjusted to generate a required virtual building, and may be generated and manufactured according to the generated virtual building to obtain a real building.

It is to be understood that, although various steps in the flowcharts of the above embodiments is displayed sequentially as indicated by the arrows, the steps are not necessarily performed sequentially in the order indicated by the arrows. Unless explicitly stated herein, there are no strict order restrictions on performing these steps, and these steps may be performed in other orders. Moreover, at least some of the steps in each embodiment may include a plurality of sub-steps or a plurality of stages. The sub-steps or stages are not necessarily performed at the same moment but may be performed at different moments. Orders of the sub-steps or stages are not necessarily sequentially performed, but may be performed alternately with other steps or at least part of sub-steps or stages in other steps.

Figure 11:
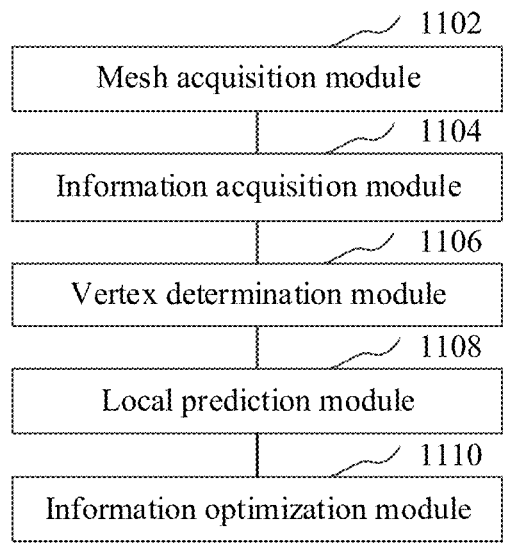
FIG. 11 is a structural block diagram of a skinning apparatus in some embodiments.

In some embodiments, as shown in FIG. 11, there is provided a skinning apparatus which may be part of a computer device using a software module or a hardware module, or a combination of both. The apparatus specifically includes a mesh acquisition module 1102, an information acquisition module 1104, a vertex determination module 1106, a local prediction module 1108, and an information optimization module 1110. The mesh acquisition module 1102 is configured to acquire a 3D mesh for skinning of a skeletal structure of a 3D object, the 3D mesh including a plurality of vertices and the skeletal structure including a plurality of joints; the information acquisition module 1104 is configured to acquire global joint weight information corresponding to each of the plurality of vertices, the global joint weight information i corresponding to a vertex including associated joints of the vertex predicted based on the whole 3D mesh, and joint weight values of the associated joints; the vertex determination module 1106 is configured to determine a target vertex to be locally predicted from the vertices of the 3D mesh based on the global joint weight information; the local prediction module 1108 is configured to perform a local prediction based on a vertex feature of the target vertex to obtain local joint weight information of the target vertex, the local joint weight information including a local associated joint of the target vertex and a local joint weight value corresponding to the local associated joint; the local joint weight value indicating a degree of association between the local associated joint and the target vertex, and the local associated joint of the target vertex being an associated joint of the target vertex predicted based on a local mesh region in the 3D mesh; and the information optimization module 1110 is configured to optimize global joint weight information of the target vertex based on the local joint weight information for skinning of the 3D object using the optimized joint weight information.

In some embodiments, the vertex determination module is further configured to: determine a vertex corresponding to abnormal global joint weight information to obtain an abnormal vertex; and determine a target vertex to be locally predicted from the vertices of the 3D mesh based on the abnormal vertex, the target vertex including the abnormal vertex.

In some embodiments, the 3D mesh includes a plurality of mesh regions. The vertex determination module is further configured to: determine a mesh region to which the abnormal vertex belongs from the plurality of mesh regions of the 3D mesh to obtain an abnormal mesh region; and determine the target vertex to be locally predicted based on each vertex in the abnormal mesh region.

In some embodiments, the local prediction module is further configured to: determine, for each target vertex, an adjacent joint having an adjacent relationship with the target vertex from the joints of the skeletal structure; perform feature fusion based on a joint feature of the adjacent joint and the vertex feature of the target vertex to obtain a first local prediction reference feature corresponding to the target vertex; and perform a local prediction based on the first local prediction reference feature to obtain local joint weight information of the target vertex.

In some embodiments, the local prediction module is further configured to: determine a mesh region to which the target vertex belongs in the 3D mesh to obtain a target mesh region; acquire a joint corresponding to the target mesh region from the joints of the skeletal structure to obtain a candidate joint; calculate a distance between the target vertex and each candidate joint; and select the adjacent joint having an adjacent relationship with the target vertex from each candidate joint based on the distance.

In some embodiments, the local prediction module is further configured to acquire a vertex feature corresponding to a neighbor vertex of the target vertex as a neighbor vertex feature; and perform feature fusion based on the vertex feature of the target vertex, the joint feature of the adjacent joint, and the neighbor vertex feature to obtain the first local prediction reference feature corresponding to the target vertex.

In some embodiments, the local prediction module is further configured to: determine a vertex feature difference between the neighbor vertex feature of the neighbor vertex and the vertex feature of the target vertex; concatenate the vertex feature difference and the vertex feature of the target vertex to obtain a vertex concatenation feature of the target vertex; and perform feature fusion based on the vertex concatenation feature and the joint feature of the adjacent joint to obtain the first local prediction reference feature corresponding to the target vertex.

In some embodiments, the local prediction module is further configured to: acquire, for each adjacent joint of the target vertex, a target vertex having an adjacent relationship with the adjacent joint from each target vertex to be locally predicted, and obtain an adjacent vertex corresponding to the adjacent joint; perform feature fusion based on the joint feature of the adjacent joint and a vertex feature of the adjacent vertex to obtain a joint fusion feature corresponding to the adjacent joint; perform feature fusion based on the joint fusion feature of the adjacent joint and the first local prediction reference feature to obtain a second local prediction reference feature corresponding to the target vertex; and perform a local prediction based on the second local prediction reference feature to obtain the local joint weight information of the target vertex.

In some embodiments, the local prediction module is further configured to: perform a statistical operation on the vertex feature of each adjacent vertex to obtain a vertex statistical feature; and perform feature fusion based on the joint feature of the adjacent joint and the vertex statistical feature to obtain the joint fusion feature corresponding to the adjacent joint.

In some embodiments, the local prediction module is further configured to: acquire a joint feature of a neighbor joint corresponding to an adjacent joint as a neighbor joint feature; perform feature fusion on the joint feature of the adjacent joint and the neighbor joint feature to obtain a preliminary fusion feature corresponding to the adjacent joint; and perform feature fusion on the preliminary fusion feature corresponding to the adjacent joint and the vertex statistical feature to obtain the joint fusion feature corresponding to the adjacent joint.

In some embodiments, the local prediction module is further configured to: determine a neighbor vertex of the target vertex and acquire a first local prediction reference feature corresponding to the neighbor vertex; perform feature fusion based on the first local prediction reference feature of the target vertex and the first local prediction reference feature of the neighbor vertex to obtain a local prediction fusion feature corresponding to the target vertex; and perform feature fusion on the local prediction fusion feature and the joint fusion feature of the adjacent joint to obtain the second local prediction reference feature corresponding to the target vertex.

In some embodiments, the local prediction module is further configured to perform a local prediction based on the second local prediction reference feature to obtain the local joint weight information of the target vertex, including: determining a neighbor vertex of the target vertex, and acquiring a second local prediction reference feature corresponding to the neighbor vertex; performing feature fusion on the second local prediction reference feature corresponding to the target vertex and the second local prediction reference feature of the neighbor vertex to obtain a target local prediction reference feature corresponding to the target vertex; and performing a local prediction based on the target local prediction reference feature to obtain the local joint weight information of the target vertex.

In some embodiments, the local prediction module is further configured to: calculate differences between the second local prediction reference feature of the neighbor vertex and the second local prediction reference feature of the target vertex to obtain a second reference feature difference; perform feature concatenation on the second reference feature difference and the second local prediction reference feature of the target vertex to obtain a second reference concatenation feature; and obtain the target local prediction reference feature corresponding to the target vertex based on the second reference concatenation feature.

For the specific definition of the skinning apparatus, reference is made to the above definition of the skinning method. The various modules in the above skinning apparatus may be implemented in whole or in part by software, hardware, and combinations thereof. The above modules may be embedded in hardware form or independent of a processor in a computer device, or may be stored in software form in a memory in the computer device, which is convenient for the processor to call to perform the corresponding operations of the above modules.

Figure 12:
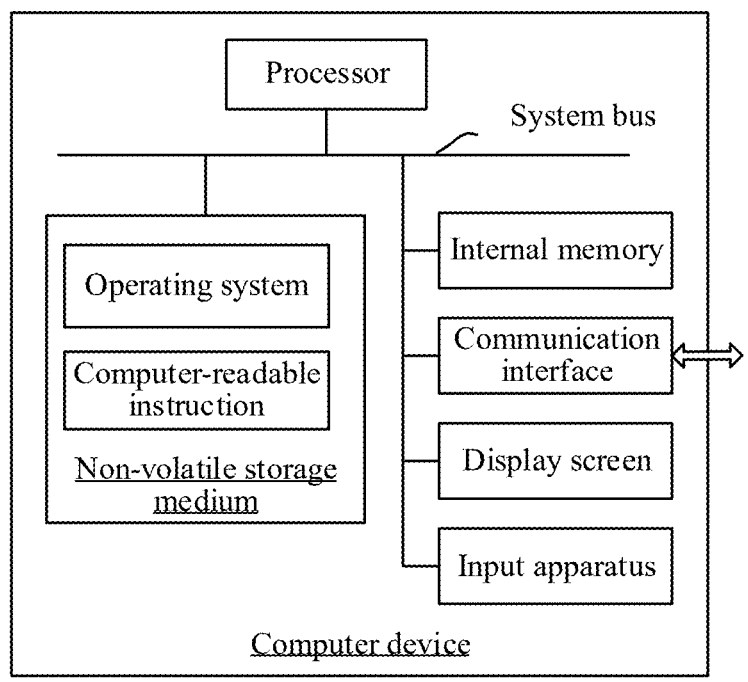
FIG. 12 is an internal structure diagram of a computer device in some embodiments.

In some embodiments, a computer device is provided. The computer device may be a terminal, the internal structure of which may be as shown in FIG. 12. The computer device includes a processor, a memory, a communication interface, a display screen, and an input apparatus connected by a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for the operation of the operating system and computer-readable instructions in the non-volatile storage medium. The communication interface of the computer device is configured to perform wired or wireless communication with an external terminal, and the wireless communication may be implemented through WIFI, operator network, near-field communication (NFC) or other technologies. The computer-readable instructions, when executed by the processor, implement a skinning method. The display screen of the computer device may be a liquid crystal display screen or an electronic ink display screen. The input apparatus of the computer device may be a touch layer covered on the display screen, and may also be a key, a trackball or a touch pad arranged on the housing of the computer device, and may further be an external keyboard, a touch pad or a mouse, and the like.

Figure 13:
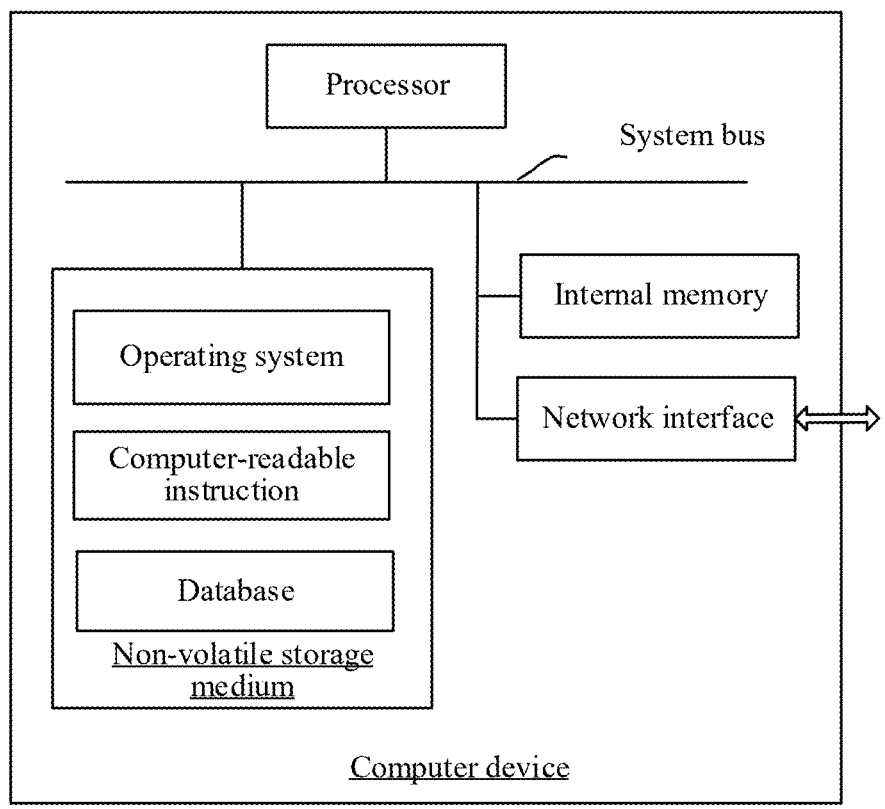
FIG. 13 is an internal structure diagram of a computer device in some embodiments.

In some embodiments, a computer device is provided. The computer device may be a server, the internal structure of which may be as shown in FIG. 13. The computer device includes a processor, a memory, and a network interface connected by a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for the operation of the operating system and computer-readable instructions in the non-volatile storage medium. The database of the computer device is used for storing data involved in the skinning method. The network interface of the computer device is configured to communicate with an external terminal via a network connection. The computer-readable instructions, when executed by the processor, implement a skinning method.

The skilled in the art may understand that, the structures shown in FIG. 12 and FIG. 13 are merely block diagrams of a partial structure related to a solution in the present disclosure, and does not constitute a limitation to the computer device to which the solution in the present disclosure is applied. Specifically, the computer device may include more or fewer components than those shown in the drawings, or have some components combined, or have a different component deployment.

In some embodiments, a computer device is further provided, including one or more processors and a memory storing computer-readable instructions. The computer-readable instructions, when executed by the one or more processors, cause the one or more processors to implement the steps in the above method embodiments.

In some embodiments, one or more non-volatile readable storage media are provided, storing computer-readable instructions. The computer-readable instructions, when executed by the one or more processors, cause the one or more processors to implement the steps in the above method embodiments.

In some embodiments, a computer program product is provided, including computer-readable instructions. The computer-readable instructions, when executed by a processor, implement the steps in the above method embodiments.

Those ordinarily skilled in the art may understand that, implementing all or part of the flow of the methods of the above embodiments may be accomplished by instructing the related hardware via the computer-readable instructions. The computer-readable instructions may be stored on a non-volatile computer-readable storage medium; the computer-readable instructions, when executed, may include the flow of the embodiments of the above methods. Any reference to the memory, storage, database, or other medium used in the embodiments provided by the present disclosure may include at least one of a non-volatile memory and a volatile memory. The non-volatile memory may include read-only memory (ROM), magnetic tape, floppy disk, flash memory, or optical storage, and the like. The volatile memory may include random-access memory (RAM) or external cache memory. By way of illustration and not limitation, the RAM may be in a variety of forms such as a static random-access memory (SRAM) or a dynamic random-access memory (DRAM).

Each technical feature of the above embodiments may be combined in different manners to form other embodiments. In order to make the description concise, not all the possible combinations of each technical feature in the above embodiments are described. However, to the extent that the combinations of these technical features is not inconsistent, they should be considered the scope of the specification.

The above embodiments represent only several implementations of the present disclosure with specific and detailed descriptions, but they are not to be construed as limiting the scope of the invention patent. The ordinarily skilled in the art would have been able to make several variations and modifications without departing from the concept of the present disclosure, which fall within the scope of the present disclosure. Therefore, the protection scope of the patent of the present disclosure shall be subject to the appended claims.

What is claimed is:

1. A skinning method executed by a computer device, the method comprising:
    acquiring a three-dimensional (3D) mesh for skinning a skeletal structure of a 3D object, the 3D mesh comprising a plurality of vertices and the skeletal structure comprising a plurality of joints;
    respectively acquiring global joint weight information corresponding to the plurality of vertices, the global joint weight information corresponding to a vertex comprising associated joints of the vertex predicted based on the whole 3D mesh and joint weight values of the associated joints;
    determining a target vertex to be locally predicted from the vertices of the 3D mesh based on the global joint weight information;
    performing a local prediction based on a vertex feature of the target vertex to obtain local joint weight information of the target vertex, the local joint weight information comprising a local associated joint of the target vertex and a local joint weight value corresponding to the local associated joint; the local joint weight value indicating a degree of association between the local associated joint and the target vertex, and the local associated joint of the target vertex being an associated joint of the target vertex predicted based on a local mesh region in the 3D mesh; and
    optimizing global joint weight information of the target vertex based on the local joint weight information to obtain optimized joint weight information, and generating skinned mesh of the 3D object using the optimized joint weight information.

2. The method according to claim 1, wherein the determining a target vertex to be locally predicted from the vertices of the 3D mesh based on the global joint weight information comprises:
    determining a vertex corresponding to abnormal global joint weight information to obtain an abnormal vertex; and
    determining a target vertex to be locally predicted from the vertices of the 3D mesh based on the abnormal vertex, the target vertex comprising the abnormal vertex.

3. The method according to claim 2, wherein the 3D mesh comprises a plurality of mesh regions, and the determining a target vertex to be locally predicted from the vertices of the 3D mesh based on the abnormal vertex comprises:
    determining a mesh region to which the abnormal vertex belongs from the plurality of mesh regions of the 3D mesh to obtain an abnormal mesh region; and
    determining the target vertex to be locally predicted based on vertices in the abnormal mesh region.

4. The method according to claim 1, wherein the performing a local prediction based on a vertex feature of the target vertex to obtain local joint weight information of the target vertex comprises:
    determining, for the target vertex, an adjacent joint having an adjacent relationship with the target vertex from the joints of the skeletal structure;
    performing feature fusion based on a joint feature of the adjacent joint and the vertex feature of the target vertex to obtain a first local prediction reference feature corresponding to the target vertex; and
    performing a local prediction based on the first local prediction reference feature to obtain the local joint weight information of the target vertex.

5. The method according to claim 4, wherein the determining an adjacent joint having an adjacent relationship with the target vertex from the joints of the skeletal structure comprises:
    determining a mesh region to which the target vertex belongs in the 3D mesh to obtain a target mesh region;
    acquiring a joint corresponding to the target mesh region from the joints of the skeletal structure to obtain at least one candidate joint;
    calculating a distance between the target vertex and the at least one candidate joint; and
    selecting the adjacent joint having an adjacent relationship with the target vertex from the at least one candidate joint based on the distance.

6. The method according to claim 4, wherein the performing feature fusion based on a joint feature of the adjacent joint and the vertex feature of the target vertex to obtain a first local prediction reference feature corresponding to the target vertex comprises:
    acquiring a vertex feature corresponding to a neighbor vertex of the target vertex as a neighbor vertex feature; and
    performing feature fusion based on the vertex feature of the target vertex, the joint feature of the adjacent joint, and the neighbor vertex feature to obtain the first local prediction reference feature corresponding to the target vertex.

7. The method according to claim 6, wherein the performing feature fusion based on the vertex feature of the target vertex, the joint feature of the adjacent joint, and the neighbor vertex feature to obtain the first local prediction reference feature corresponding to the target vertex comprises:
determining a vertex feature difference between the neighbor vertex feature of the neighbor vertex and the vertex feature of the target vertex;
concatenating the vertex feature difference and the vertex feature of the target vertex to obtain a vertex concatenation feature of the target vertex; and
performing feature fusion based on the vertex concatenation feature and the joint feature of the adjacent joint to obtain the first local prediction reference feature corresponding to the target vertex.

8. The method according to claim 4, wherein the performing a local prediction based on the first local prediction reference feature to obtain the local joint weight information of the target vertex comprises:
acquiring, for an adjacent joint of the target vertex, a target vertex having an adjacent relationship with the adjacent joint from the target vertex to be locally predicted, and obtaining an adjacent vertex corresponding to the adjacent joint;
performing feature fusion based on the joint feature of the adjacent joint and a vertex feature of the adjacent vertex to obtain a joint fusion feature corresponding to the adjacent joint;
performing feature fusion based on the joint fusion feature of the adjacent joint and the first local prediction reference feature to obtain a second local prediction reference feature corresponding to the target vertex; and
performing a local prediction based on the second local prediction reference feature to obtain the local joint weight information of the target vertex.

9. The method according to claim 8, wherein the performing feature fusion based on the joint feature of the adjacent joint and a vertex feature of the adjacent vertex to obtain a joint fusion feature corresponding to the adjacent joint comprises:
performing a statistical operation on the vertex feature of the adjacent vertex to obtain a vertex statistical feature; and
performing feature fusion based on the joint feature of the adjacent joint and the vertex statistical feature to obtain the joint fusion feature corresponding to the adjacent joint.

10. The method according to claim 9, wherein the performing feature fusion based on the joint feature of the adjacent joint and the vertex statistical feature to obtain the joint fusion feature corresponding to the adjacent joint comprises:
acquiring a joint feature of a neighbor joint corresponding to the adjacent joint as a neighbor joint feature;
performing feature fusion on the joint feature of the adjacent joint and the neighbor joint feature to obtain a preliminary fusion feature corresponding to the adjacent joint; and
performing feature fusion on the preliminary fusion feature corresponding to the adjacent joint and the vertex statistical feature to obtain the joint fusion feature corresponding to the adjacent joint.

11. The method according to claim 8, wherein the performing feature fusion based on the joint fusion feature of the adjacent joint and the first local prediction reference feature to obtain a second local prediction reference feature corresponding to the target vertex comprises:
determining a neighbor vertex of the target vertex, and acquiring a first local prediction reference feature corresponding to the neighbor vertex;
performing feature fusion based on the first local prediction reference feature of the target vertex and the first local prediction reference feature of the neighbor vertex to obtain a local prediction fusion feature corresponding to the target vertex; and
performing feature fusion on the local prediction fusion feature and the joint fusion feature of the adjacent joint to obtain the second local prediction reference feature corresponding to the target vertex.

12. The method according to claim 8, wherein the performing a local prediction based on the second local prediction reference feature to obtain the local joint weight information of the target vertex comprises:
determining a neighbor vertex of the target vertex, and acquiring a second local prediction reference feature corresponding to the neighbor vertex;
performing feature fusion on the second local prediction reference feature corresponding to the target vertex and the second local prediction reference feature of the neighbor vertex to obtain a target local prediction reference feature corresponding to the target vertex; and
performing a local prediction based on the target local prediction reference feature to obtain the local joint weight information of the target vertex.

13. The method according to claim 12, wherein the performing feature fusion on the second local prediction reference feature corresponding to the target vertex and the second local prediction reference feature of the neighbor vertex to obtain a target local prediction reference feature corresponding to the target vertex comprises:
calculating differences between the second local prediction reference feature of the neighbor vertex and the second local prediction reference feature of the target vertex to obtain a second reference feature difference;
performing feature concatenation on the second reference feature difference and the second local prediction reference feature of the target vertex to obtain a second reference concatenation feature; and
obtaining the target local prediction reference feature corresponding to the target vertex based on the second reference concatenation feature.

14. A skinning apparatus, comprising:
one or more processors and a memory storing computer-readable instructions, the computer-readable instructions, when executed by the one or more processors, causing the one or more processors to implement:
acquiring a three-dimensional (3D) mesh for skinning a skeletal structure of a 3D object, the 3D mesh comprising a plurality of vertices and the skeletal structure comprising a plurality of joints;
respectively acquiring global joint weight information corresponding to the plurality of vertices, the global joint weight information corresponding to a vertex comprising associated joints of the vertex predicted based on the whole 3D mesh and joint weight values of the associated joints;
determining a target vertex to be locally predicted from the vertices of the 3D mesh based on the global joint weight information;
performing a local prediction based on a vertex feature of the target vertex to obtain local joint weight information of the target vertex, the local joint weight information comprising a local associated joint of the target vertex and a local joint weight value corresponding to the local associated joint; the local joint weight value indicating a degree of association between the local associated joint and the target vertex, and the local associated joint of the target vertex being an associated joint of the target vertex predicted based on a local mesh region in the 3D mesh; and optimizing global joint weight information of the target vertex based on the local joint weight information to obtain optimized joint weight information, and generating skinned mesh of the 3D object using the optimized joint weight information.

15. The apparatus according to claim 14, wherein the determining a target vertex to be locally predicted from the vertices of the 3D mesh based on the global joint weight information comprises:

determining a vertex corresponding to abnormal global joint weight information to obtain an abnormal vertex; and determining a target vertex to be locally predicted from the vertices of the 3D mesh based on the abnormal vertex, the target vertex comprising the abnormal vertex.

16. The apparatus according to claim 15, wherein the 3D mesh comprises a plurality of mesh regions, and the determining a target vertex to be locally predicted from the vertices of the 3D mesh based on the abnormal vertex comprises:

determining a mesh region to which the abnormal vertex belongs from the plurality of mesh regions of the 3D mesh to obtain an abnormal mesh region; and determining the target vertex to be locally predicted based on vertices in the abnormal mesh region.

17. The apparatus according to claim 14, wherein the performing a local prediction based on a vertex feature of the target vertex to obtain local joint weight information of the target vertex comprises:

determining, for the target vertex, an adjacent joint having an adjacent relationship with the target vertex from the joints of the skeletal structure;

performing feature fusion based on a joint feature of the adjacent joint and the vertex feature of the target vertex to obtain a first local prediction reference feature corresponding to the target vertex; and performing a local prediction based on the first local prediction reference feature to obtain the local joint weight information of the target vertex.

18. The apparatus according to claim 17, wherein the determining an adjacent joint having an adjacent relationship with the target vertex from the joints of the skeletal structure comprises:

determining a mesh region to which the target vertex belongs in the 3D mesh to obtain a target mesh region;

acquiring a joint corresponding to the target mesh region from the joints of the skeletal structure to obtain at least one candidate joint;

calculating a distance between the target vertex and the at least one candidate joint; and selecting the adjacent joint having an adjacent relationship with the target vertex from the at least one candidate joint based on the distance.

19. The apparatus according to claim 17, wherein the performing feature fusion based on a joint feature of the adjacent joint and the vertex feature of the target vertex to obtain a first local prediction reference feature corresponding to the target vertex comprises:

acquiring a vertex feature corresponding to a neighbor vertex of the target vertex as a neighbor vertex feature; and performing feature fusion based on the vertex feature of the target vertex, the joint feature of the adjacent joint, and the neighbor vertex feature to obtain the first local prediction reference feature corresponding to the target vertex.

20. One or more non-transitory readable storage media storing computer-readable instructions, the computer-readable instructions, when executed by one or more processors, causing the one or more processors to implement:

acquiring a three-dimensional (3D) mesh for skinning a skeletal structure of a 3D object, the 3D mesh comprising a plurality of vertices and the skeletal structure comprising a plurality of joints;

respectively acquiring global joint weight information corresponding to the plurality of vertices, the global joint weight information corresponding to a vertex comprising associated joints of the vertex predicted based on the whole 3D mesh and joint weight values of the associated joints;

determining a target vertex to be locally predicted from the vertices of the 3D mesh based on the global joint weight information;

performing a local prediction based on a vertex feature of the target vertex to obtain local joint weight information of the target vertex, the local joint weight information comprising a local associated joint of the target vertex and a local joint weight value corresponding to the local associated joint; the local joint weight value indicating a degree of association between the local associated joint and the target vertex, and the local associated joint of the target vertex being an associated joint of the target vertex predicted based on a local mesh region in the 3D mesh; and optimizing global joint weight information of the target vertex based on the local joint weight information to obtain optimized joint weight information, and generating skinned mesh of the 3D object using the optimized joint weight information.

* * * * *